(12) United States Patent
Prasad et al.

(10) Patent No.: US 12,608,528 B2
(45) Date of Patent: Apr. 21, 2026

(54) SYSTEMS, DEVICES, AND METHODS FOR DEDICATED LOW TEMPERATURE DESIGN AND OPERATION

(71) Applicant: Arm Limited, Cambridge (GB)

(72) Inventors: Divya Madapusi Srinivas Prasad, San Jose, CA (US); David Victor Pietromonaco, Cupertino, CA (US); Brian Tracy Cline, Austin, TX (US)

(73) Assignee: Arm Limited, Cambridge (GB)

( * ) Notice: Subject to any disclaimer, the term of this patent is extended or adjusted under 35 U.S.C. 154(b) by 847 days.

(21) Appl. No.: 17/798,518

(22) PCT Filed: Feb. 8, 2021

(86) PCT No.: PCT/GB2021/050275
§ 371 (c)(1),
(2) Date: Aug. 9, 2022

(87) PCT Pub. No.: WO2021/160995
PCT Pub. Date: Aug. 19, 2021

(65) Prior Publication Data
US 2023/0062482 A1 Mar. 2, 2023

Related U.S. Application Data

(60) Provisional application No. 62/972,523, filed on Feb. 10, 2020.

(51) Int. Cl.
G06F 30/367 (2020.01)
G06F 30/337 (2020.01)
(Continued)

(52) U.S. Cl.
CPC .......... G06F 30/367 (2020.01); G06F 30/337 (2020.01); G06F 30/373 (2020.01); G06F 30/398 (2020.01); G06F 2119/06 (2020.01)

(58) Field of Classification Search
CPC .... G06F 30/367; G06F 30/373; G06F 30/398; G06F 30/337; G06F 2119/06
(Continued)

(56) References Cited

U.S. PATENT DOCUMENTS

| | | | | |
|---|---|---|---|---|
| 3,820,126 A | * | 6/1974 | Haratake | G03B 9/58 |
| | | | | 396/230 |
| 5,008,771 A | * | 4/1991 | Palara | F02P 3/0552 |
| | | | | 327/512 |

(Continued)

FOREIGN PATENT DOCUMENTS

| | | |
|---|---|---|
| CN | 10640680 A | 2/2017 |
| TW | I675425 B | 10/2019 |

OTHER PUBLICATIONS

Fu et al., Chinese Patent Document No. CN-108875192-A, published Nov. 23, 2018, 4 pages including abstract, claims and 1 drawing. (Year: 2018).*

(Continued)

*Primary Examiner* — Phallaka Kik
(74) *Attorney, Agent, or Firm* — Pramudji Law Group PLLC; Ari Pramudji

(57) ABSTRACT

According to one implementation of the present disclosure, a method includes providing one or more tuning parameters of a transistor device at a first temperature of a range of temperatures below a temperature threshold; and adjusting the one or more tuning parameters until one or more second parameters of the transistor device corresponds to substantially the same value at the first temperature as a second temperature above the temperature threshold.

8 Claims, 31 Drawing Sheets

3300

3310 — Provide one or more tuning parameters of a transistor device at a first temperature of a range of temperatures below a temperature threshold 3320 — Adjust the one or more tuning parameters until one or more second parameters of the transistor device corresponds to substantially the same value at the first temperature as a second temperature above the temperature threshold

(51) Int. Cl.
   *G06F 30/373*    (2020.01)
   *G06F 30/398*    (2020.01)
   *G06F 119/06*    (2020.01)

(58) Field of Classification Search
   USPC ............ 716/133, 136, 111, 109; 703/14, 18
   See application file for complete search history.

(56)                References Cited

U.S. PATENT DOCUMENTS

| | | | | |
|---|---|---|---|---|
| 5,399,960 | A * | 3/1995 | Gross ..................... | G05F 3/245<br>327/541 |
| 6,560,333 | B1 * | 5/2003 | Consiglio ............ | H04M 19/08<br>379/413 |
| 7,366,997 | B1 * | 4/2008 | Rahmat ................ | G06F 30/367<br>716/120 |
| 8,520,451 | B2 * | 8/2013 | Son ........................ | G11C 5/147<br>365/226 |
| 10,340,903 | B2 * | 7/2019 | Lee ........................ | H03K 5/134 |
| 10,378,967 | B1 | 8/2019 | Vogelsang et al. | |
| 2002/0113631 | A1 * | 8/2002 | Gossmann .......... | H03D 13/004<br>327/157 |
| 2004/0233737 | A1 * | 11/2004 | Benzinger ............... | G11C 5/14<br>365/199 |
| 2006/0091935 | A1 * | 5/2006 | Tschanz ................. | G06F 1/206<br>327/534 |
| 2007/0120551 | A1 * | 5/2007 | Shin ....................... | G01K 1/026<br>324/71.5 |
| 2007/0159237 | A1 * | 7/2007 | Zimlich .................. | G05F 3/30<br>327/539 |
| 2008/0204155 | A1 * | 8/2008 | Olmos ................... | H03K 3/354<br>331/108 R |
| 2009/0134476 | A1 * | 5/2009 | Richards, Jr. ........ | H10D 30/637<br>257/E21.417 |
| 2009/0290428 | A1 * | 11/2009 | Noh ......................... | G11C 7/04<br>365/189.09 |
| 2011/0059575 | A1 * | 3/2011 | Tsubuku ............ | H10D 30/0321<br>257/E21.459 |
| 2011/0062435 | A1 * | 3/2011 | Yamazaki .......... | H10D 30/6755<br>257/43 |
| 2011/0068766 | A1 * | 3/2011 | Nag ......................... | G05F 3/16<br>323/313 |
| 2011/0211717 | A1 * | 9/2011 | Hoevesteen ......... | H04R 25/505<br>381/323 |
| 2012/0323508 | A1 * | 12/2012 | Vilas Boas ........... | G01R 19/32<br>324/105 |
| 2017/0069766 | A1 | 3/2017 | Park et al. | |
| 2018/0145671 | A1 * | 5/2018 | Lee ........................ | H03K 5/134 |
| 2018/0294342 | A1 * | 10/2018 | Xiang ................... | H01L 21/265 |

OTHER PUBLICATIONS

TIPO Office Action; TW 110105127; Mar. 7, 2025.
PCT International Search Report and Written Opinion; PCT/GB2021/050275; Jun. 22, 2021.
Fitrio, et al; Subthreshold Leakage Current Reduction Techniques for Static Random Access Memory; Proceedings of SPIE; vol. 5649; Smart Structures, Devices, and Systems II; Feb. 28, 2005. DOI: 10.1117/12.582332.

* cited by examiner

600

610 — | Transistor | VDD | $I_{off}$ | $I_{on}$ | $C_B$ |

620 — Cool to $T_{cold}$ at $T_{cold}$

| Cold Transistor | Reduced leakage = $I_{off\text{-}new}$ | Increasing Vth and mobility |

Reduce Vth until $I_{off\text{-}new} \geq I_{off}$  — 630

Reduce $V_{DD}$ & $V_{TH}$ until
$I_{off} = I_{off\text{-}new}$  — 640
temp perf = temp perf new
area = area new 5nm copper wires BEOL

| CD/Thickness | R/um (R=0.3, p=0.25) |
|---|---|
| Mx: 14/21 | 935 |
| ViaX | 45.9 |
| My: 24/48 | 82 |
| ViaY | 18.75 |
| Mx: 36/80 | 20.4 |
| ViaZ | 8.3 |

Proposed 5nm aluminum wires BEOL at T<200K

| CD/Thickness | R/um (R=0.3, p=0.25) |
|---|---|
| Mx: 14/21 | 289 |
| ViaX | 12 |
| My: 24/48 | 48.8 |
| ViaY | 4.17 |
| Mx: 36/80 | 15.92 |
| ViaZ | 1.85 |

2400

2500

3500

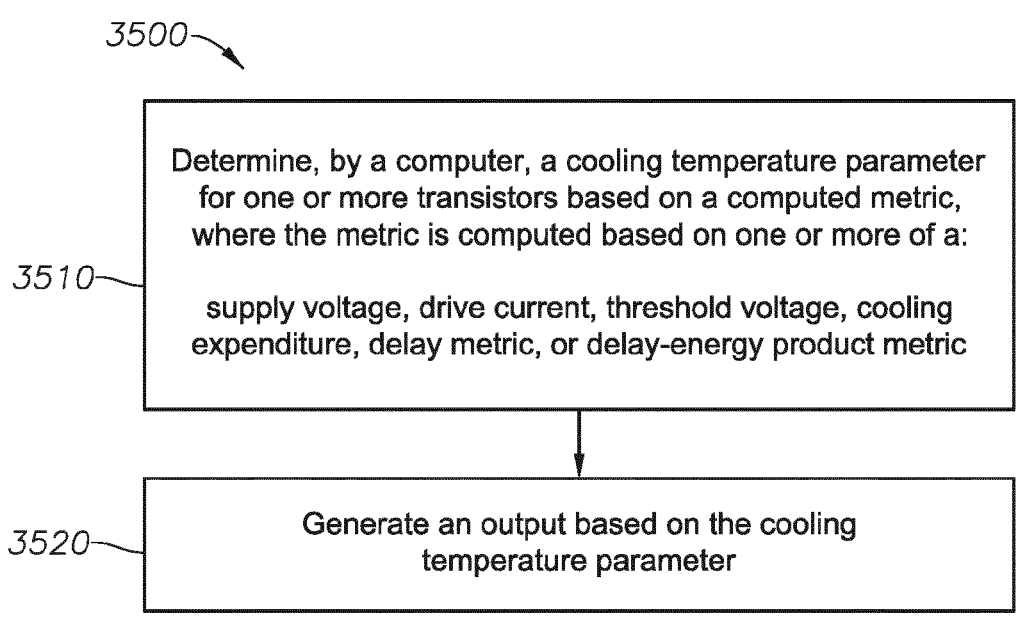

3510 — Determine, by a computer, a cooling temperature parameter for one or more transistors based on a computed metric, where the metric is computed based on one or more of a:

supply voltage, drive current, threshold voltage, cooling expenditure, delay metric, or delay-energy product metric 3520 — Generate an output based on the cooling temperature parameter

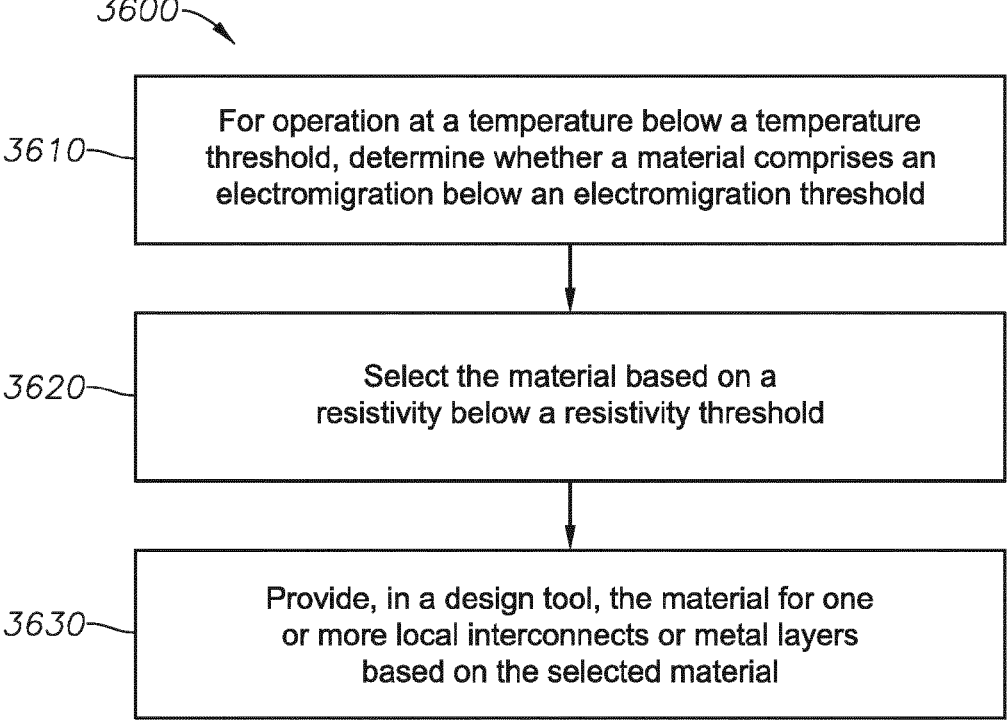

3610 — For operation at a temperature below a temperature threshold, determine whether a material comprises an electromigration below an electromigration threshold 3620 — Select the material based on a resistivity below a resistivity threshold 3630 — Provide, in a design tool, the material for one or more local interconnects or metal layers based on the selected material

3910
Determine a polarity, sizing, or voltage threshold of circuit devices and wire connections of an integrated circuit based on whether one or more metals coupled to the integrated circuit is below a temperature threshold 3920
Generate, by a design tool, an output based on the determined polarity

SYSTEMS, DEVICES, AND METHODS FOR DEDICATED LOW TEMPERATURE DESIGN AND OPERATION

I. FIELD

The present disclosure is generally related to systems, devices and methods for low dedicated low temperature (e.g., super-cooled and cryo-cooled) design and operation.

II. DESCRIPTION OF RELATED ART

Advances in technology have resulted in smaller and/or more powerful computing devices, with ever growing power, performance, area and cost (PPAC) demands. Likewise, data centers, where thousands or tens of thousands of microprocessors may be operated, electrical power, performance, area, and cost consumption is also significant. Furthermore, data centers have a large footprint due to the various components necessary for maintaining its facilities, including cooling equipment. While computing demand on the spectrum from as small as transistor devices to data centers (or even larger has increased dramatically, certain limitations exist to overall PPAC demands.

In one example, processing speed and power of high-performance microprocessors at advanced technology nodes (e.g., sub-7 nm) can be limited by both transistors and wires. Microarchitecture is rapidly changing to meet demands of current and future market segments and would need to be tailored for each technology to achieve optimal PPAC. In other examples, drawbacks to PPAC include power and memory bottlenecks, reliability and yield. Accordingly, such devices, computer systems, high-performance-compute systems and data centers would require significant computing and networking capabilities. For such integrated systems, there is an ever-increasing demand for greater area power, performance, area, cost (PPAC) efficiency.

III. BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, circuits or apparatuses described herein.

FIGS. 33-39 are operational methods of certain aspects in accordance with various implementations described herein.

Figures 1, 2:
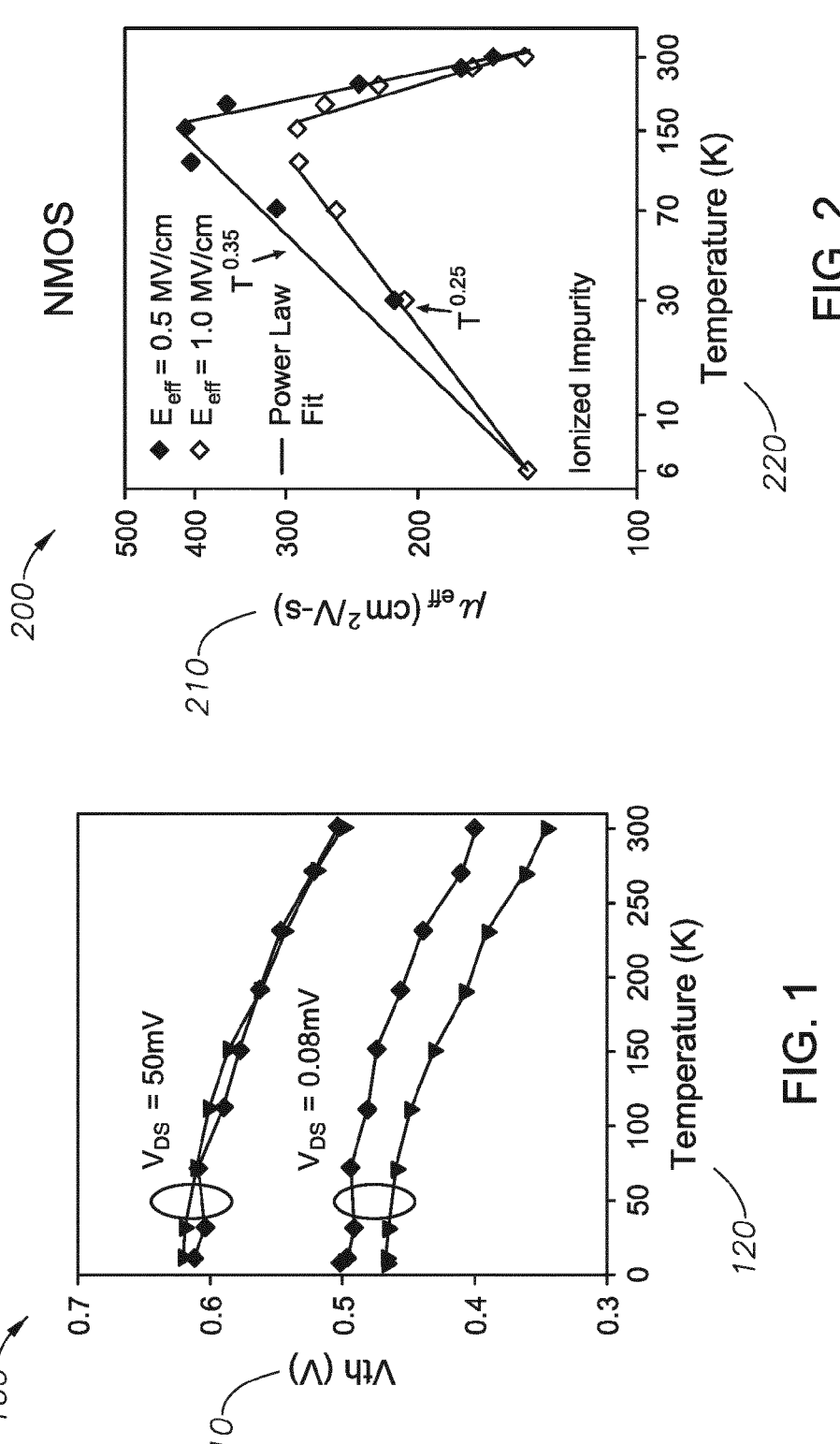
FIGS. 1-5 are exemplary graphs in accordance with various implementations described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration and many of the units are normalized to showcase relative trends. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. While certain diagrams as illustrated herein are shown in two-dimensions, aspects of the diagrams as provided herein are to be understood to be three-dimensional having X, Y and Z axes. Therefore, the following detailed description is not to be taken to limit claimed subject matter and/or equivalents.

IV. DETAILED DESCRIPTION

Particular implementations of the present disclosure are described below with reference to the drawings. In the description, common features are designated by common reference numbers throughout the drawings.

According to one implementation of the present disclosure, a method includes providing one or more tuning parameters of a transistor device at a first temperature of a range of temperatures below a temperature threshold; and adjusting the one or more tuning parameters until one or more second parameters of the transistor device corresponds to substantially the same value (or a factor thereof) at the first temperature as a second temperature above the temperature threshold.

According to one implementation of the present disclosure, a method includes: determining, by a computer device, a cooling temperature parameter for one or more transistors based on a computed metric, wherein the metric is computed based on one or more of a supply voltage, a drive current, threshold voltage, a process expenditure, a cooling expenditure, a delay metric; or a delay-energy product metric.

According to one implementation of the present disclosure, an integrated circuit includes one or more of memory and/or logic devices; one or more interconnects or metal layers, and/or barrier/liner materials and dielectric materials in the back-end-of-the-line (BEOL) stack, where the one or more interconnects, metal layers, or barrier, liner or dielectric materials are formed of one or more materials based on predetermined properties at a temperature below a temperature threshold.

According to one implementation of the present disclosure, a method includes selecting, in a design tool, a material for one or more interconnects or metal layers based on selection criteria, wherein the selection criteria comprises: determining whether the material comprises an electromigration below an electromigration threshold below a temperature threshold; and selecting the material based on a resistivity/resistance below a resistivity/resistance threshold.

According to one implementation of the present disclosure, a method includes determining a temperature sensitivity of a metal wiring or a metal level; and determining, based on the determined temperature sensitivity, one or more of: a wire width of the metal wiring; a wire spacing between at least two wires of the metal wiring type; a wire thickness of the one or more metal wirings, or a barrier and liner thickness. In some instances, the metals may also comprise of a metal capping layer (i.e., top portions of a wire).

According to one implementation of the present disclosure, a method includes determining a metal wiring type based on a temperature sensitivity of a metal wiring of an integrated circuit for operation below a temperature threshold; and generating, by a fabrication or a lithography tool, an output based on the determined metal wiring type.

According to one implementation of the present disclosure, an integrated circuit first and second inverters, where each of first and second inverters comprise a pull-up transistor and pull-down transistor, and where the pull-up transistor is a PMOS transistor and the pull-down transistor is a NMOS transistor.

According to one implementation of the present disclosure, a method includes determining a polarity, sizing, voltage threshold and/or supply voltage of circuit devices and wire connections of an integrated circuit based on whether one or more metals coupled to the integrated circuit is below a temperature threshold; and generating, an output based on the determined polarity.

Advantageously, certain inventive aspects involve leveraging the temperature response of CMOS transistor devices for optimal performance-power-area. In some implementations, the schemes and techniques include low temperature response (e.g., below 200K) of certain metals and the impact on such CMOS transistor devices. Furthermore, in certain cases, the systems, devices, and methodologies as described herein may not even be operable at temperatures above a temperature threshold (e.g., 200K), as such systems, devices, and methodologies are optimized specifically for dedicated low temperature design (e.g., below 200K).

In various implementations, inventive schemes and techniques can be utilized and optimized for memory bitcells; memory macros; VT designs; logic devices; bitlines and/or wordlines; back-end-of-line (BEOL) stacks; HPC, servers and/or datacenters, and interfacing with quantum computers, space applications (e.g., devices, methods, and systems) of the foregoing and emerging mobile-cooled devices and methods (if scalable cooling solutions permit).

Accounting for extreme climates, complementary metal oxide semiconductor (CMOS)-based hardware (i.e., CMOS circuits) may be designed for reliable operation between 395.15K (125 C) down to 218.15K (−55 C). The behavior of electrons and holes (i.e., spaces where electrons could be present, but are not currently) in transistors and wires of such CMOS circuits can be observed to be temperature-dependent; thus, leading to distinct performance-power design metrics. In contrast, according to the inventive modeling and analysis, when such circuits are operated in low temperatures (e.g., "supercooling" temperatures, for example, between 231K-150K (i.e., −42.15 C to −123.15 C)) and "cryo-cooled" temperatures (e.g., 150K to absolute 0), two parameters: mobility (M) and threshold voltage (VT, VTH) may change substantially. As observed, when mobility increases, the performance of a transistor may also increase. Also, while VT increases, performance would decrease but improvements are concurrently observed for current leakage.

Advantageously, low-temperature operation (e.g., at "supercooled" or "cryo-cooled" temperatures) of VLSI circuits provide the capacity to "tune" (as defined herein as the inventive methodologies) such parameters to target Performance-Power-Area (PPA) metrics at device-level, circuit-level and system-level.

At the device level, typically, the lowest threshold-voltage (e.g., LVT, ultra-low VT, referring to the lower VT in the process) (for circuit devices) with the highest performance is chosen across a normal operating temperature range. Accordingly, this may be conducted by accounting for a "worst" current leakage (i.e., a below a threshold current leakage) and dynamic power (i.e., below a particular power threshold) that would be tolerable for a particular circuit. Generally, the highest performant devices would be used for performance-critical portions of the design while higher VT devices (e.g., such as mixed VT designs) may be selected for other parts of the design that would not be as compute-intensive. Advantageously, in doing so, current leakage (i.e., $I_{off}$) may be conserved, and optimal dynamic and static power usage may be facilitated.

At sub-superconducting temperatures, inventive modeling and research demonstrate that circuit devices can afford to have a lower threshold-voltage while concurrently maintaining room-temperature leakage target, and also, offering even better performance in comparison to a room-temperature circuit device. Accordingly, the sub-superconducting temperatures circuit device can be shown to exhibit an improved ON-current (i.e., Ion) to OFF-current (i.e., $I_{off}$, leakage current) that can be utilized to allow for a larger range of operating voltage.

Hence, at the circuit-level, inventive schemes and techniques (as discussed in below paragraphs) are shown to benefit power, performance, and area (PPA) of circuit devices. As one example, for high-performance implementations, when utilizing voltage-threshold (VT, VTH) designs, the LVT may be used to improve PPA, and other VT "flavors" (i.e., design types, VTH libraries) can be used to manage power. As an example, for peak performance, PPA may be improved up to 1.56 times (1.56×) for high-performance designs. In another example, for low-power applications, supply voltage (VDD) may be significantly decreased (e.g., in the inventive aspects by half), while achieving room-temperature performance with greater than 3.67 times (3.67×) improved power-all by using a single VT-LVT throughout the design. Unlike classical designs, such an implementation can allow for a single VT without an area penalty.

Advantageously, such low-temperature design schemes and techniques utilize the physical phenomena observed by operating transistors at a temperature "sweet-spot" in the super-cooled and cryo-computing range. Moreover, these schemes and techniques can be expanded to the system-level and co-optimized with thermal design power (TDP) due to the strong dependence of thermal properties (i.e., self-heating) in addition to electrical properties of certain materials and respective targeted ambient temperatures. Accordingly, inventive system-level specifications for super-/cryogenic-computation can be implemented.

In addition, in contrast to classical designs that are severely guard-banded to account for the reliability of the devices, the reliability of the inventive devices improve substantially in low-temperature operations. Furthermore, such inventive super-cooled and cryo-cooled circuit devices may also utilize materials with superior electrical properties but had been previously disregarded due to worse reliability properties at room temperature.

Aspects of the present invention include the capacity for transistor device "modeling" (i.e., process-tuning, balancing of various control parameters) to improve (optimize) power, performance, and area. In implementations, transistor devices include the two separate parameters: threshold voltage (VTH) (i.e., voltage threshold (VT)) and channel carrier mobility (i.e., mobility (M)). As shown, FIG. 1 is a graphical representations depicting the behavior of the threshold voltage and FIG. 2 is a graphical representations depicting the behavior of the mobility.

Referring to FIG. 1, graph 100 is shown. As illustrated, FIG. 1 depicts threshold voltage shift of transistor devices over a range of temperature values (K) (e.g., from "room temperature" (i.e., ambient temperature, approximately 288K-300K)) to absolute zero (i.e., approximately 0K))). In FIG. 1, for an example planar transistor device, threshold voltage (in volts) 110 is plotted across a temperature range 120 from 0K to 300K for two drain-source voltages (i.e., $V_{DS}$=50 mv and $V_{DS}$=0.08 mv). According to the inventive aspects and appreciated from the graph 100, at incrementally lower temperature levels, the threshold voltage is shown to increase. Consequently, when such threshold voltages increase, the transistor overdrive would be reduced. (For example, corresponding to the drive current equation, when transistor overdrive (i.e., VDD>>VTH), the drive current increases by a factor of $(VDD-VTH)^n$, where n range from 1-2.). And thus, correspondingly, transistor performance and current leakage would decrease.

Referring to FIG. 2, graph 200 is shown. As illustrated, FIG. 2 depicts mobility shift of transistor devices over a range of temperature values (K) (e.g., from "room temperature" (i.e., ambient temperature, approximately 288K-300K)) to absolute zero (i.e., approximately 0K))). In FIG. 2, for an example planar NMOS transistor device, mobility ($\mu_{eff}$(cm$^2$/V-S)) 210 is plotted across a temperature range from 0K to 300K 220 for two power supply voltages (i.e., $V_{DD}$=0.8V and $V_{DD}$=50 mV). According to the inventive aspects and appreciated from the graphs, it can be realized that at incrementally lower temperature levels, the mobility would improve, and hence, performance of the transistor device would increase.

Advantageously, with reference to FIGS. 1-2, voltage threshold and mobility curve "sweet spots" are observed for each of the examples at superconducting temperatures. For instance, such sweet spots include the points in FIG. 2, where each curve "peaks" (i.e., inflection points) on the graph. As may be appreciated, while planar devices (e.g., in FIGS. 1 and 2) and finFET devices may behave differently, each device type would have a peak mobility and/or threshold voltage at particular superconductive/cryogenic temperatures. In the inventive aspects, such findings have been determined to be unexpected in comparison to presently known process tuning CMOS techniques.

Figure 3:
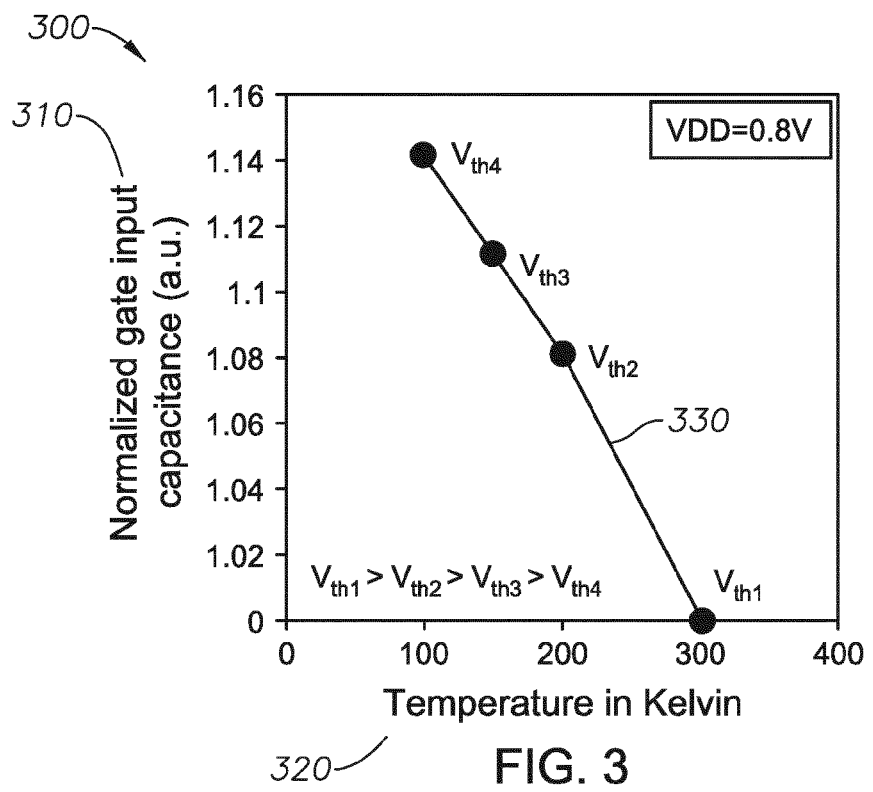

Referring to FIG. 3, an example graph 300 according to example implementations is shown. As illustrated, FIG. 3 depicts a graph representing how an increase in input gate capacitance (i.e., Cg) as a result of reduction of VTH to achieve substantially the similar leakage current (i.e., iso-$I_{off}$) across a range of temperatures values (K) (e.g., from "room temperature" (i.e., ambient temperature, approximately 288K-300K)) to cryo-temperatures (i.e., approximately 100K-120K to 0))). The graph 300 provides normalized gate input capacitance 310 from 0 to 1.16 on the Y-axis and temperature (K) 320 from 0K to 300K on the X-axis 320. On the graph 300, four threshold voltages ($V_{TH1}$, $V_{TH2}$, $V_{TH3}$, $V_{TH4}$) are provided as operating points between respective temperatures from 300K to 100K forming an operating curve 330. As illustrated, $V_{TH1}$ is greater than $V_{TH2}$, which is greater than $V_{TH3}$, which is greater than $V_{TH4}$. As shown, at incrementally lower temperature levels on the operating curve 330, the normalized gate input capacitance would increase. Hence, VTH may be shifted to achieve similar leakage and extract more performance. However, as a side-effect of lower VTH, gate capacitance would increase and impact other design metrics such as short circuit/dynamic power.

Figure 4:
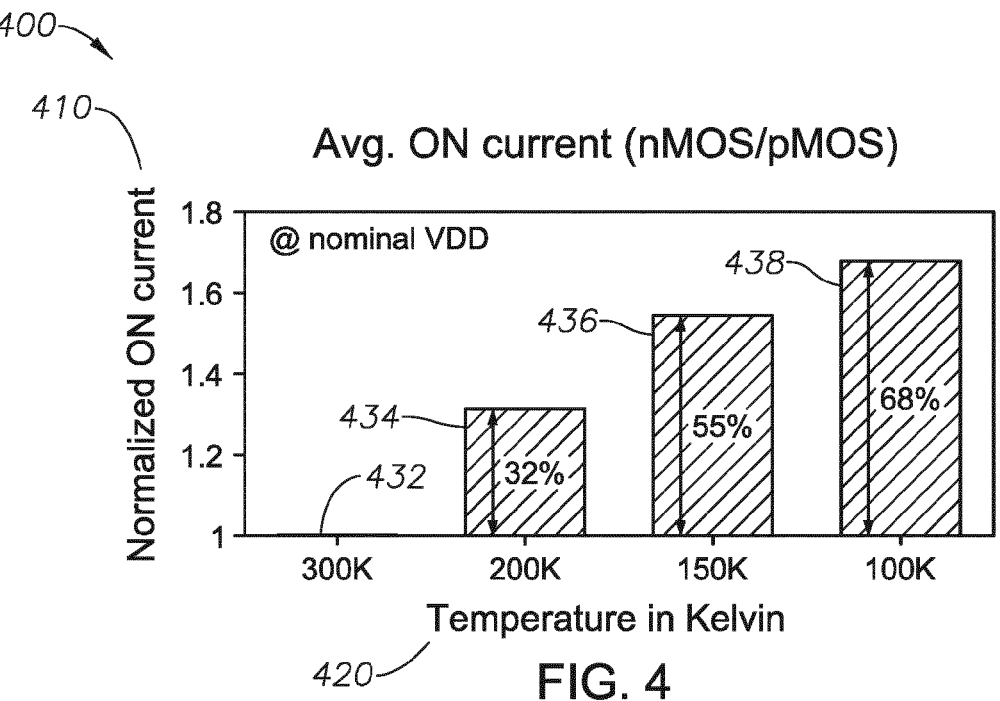

Referring to FIG. 4, an example graph 400 according to example implementations is shown. As illustrated, FIG. 4 depicts a graph representing how an increase in drive current ($I_{on}$, ON-current) along with a reduction of VTH may achieve substantially the same leakage current (i.e., iso-$I_{off}$ or in the same order-of magnitude of $I_{off}$; variability in process e.g., small variation in Vth can impact $I_{off}$ by 5 times (i.e., 5×). Hence, leakage would be within same order of magnitude) across a range of temperatures values (K) (e.g., from "room temperature" (i.e., ambient temperature, approximately 288K-300K)) to cryo-temperatures (i.e., approximately 100K-120K))). The graph 400 provides normalized ON-current (i.e., $I_{on}$) from 1 to 1.8 on the Y-axis 410 and temperature (K) from 100K to 300K on the X-axis 420. On the graph 400, four bars (i.e., 432 (no bar shown as the normalized ON-current is approximately 0 in this instance), 434, 436, 438) are provided for each respective temperature: 300K, 200K, 150K, and 100K. As illustrated, there are 32%, 55%, and 68% increases in normalized drive current at each successive lower temperature.

Figure 5:
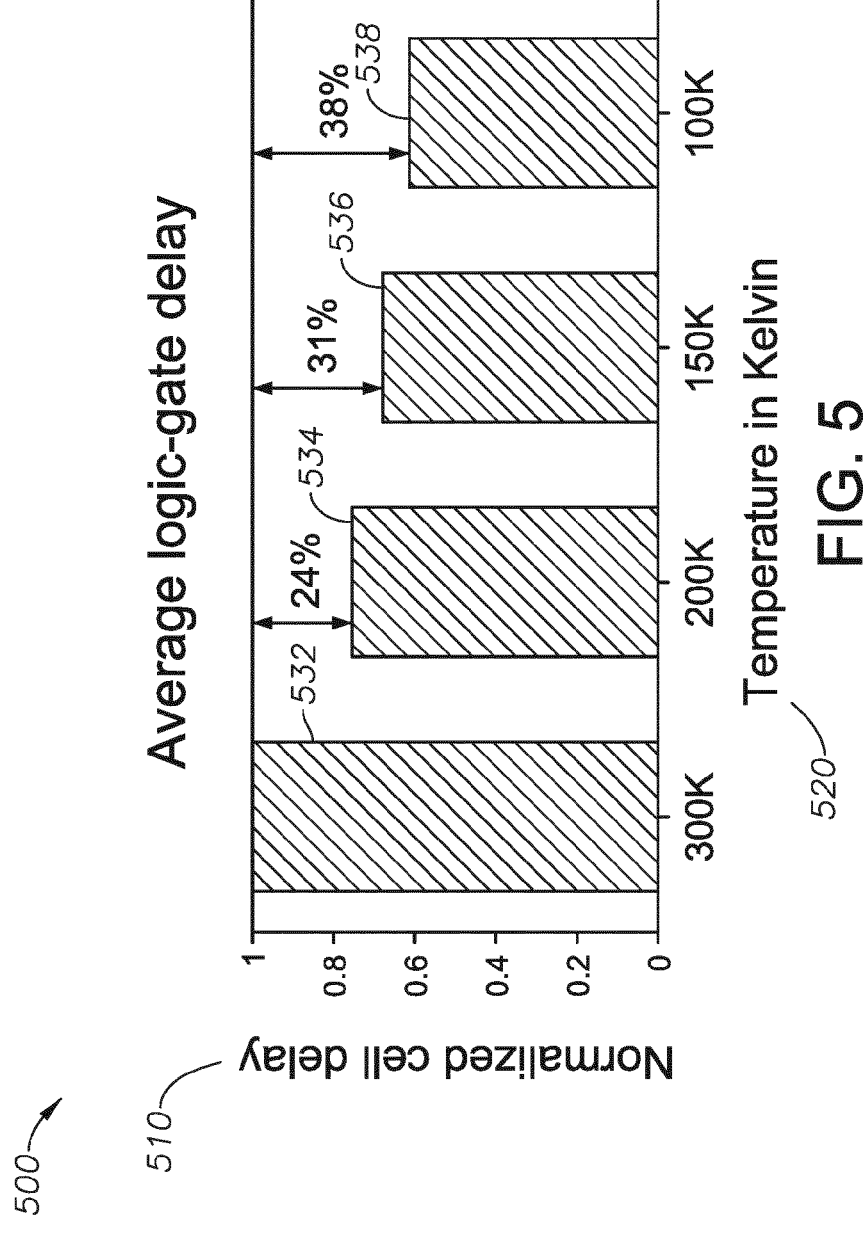

Referring to FIG. 5, an example graph 500 according to example implementations is shown. As illustrated, FIG. 5 depicts a graph representing how a reduction in gate-delay (i.e., standard cell delay, normalized cell delay) with a reduction of VTH may achieve substantially the same leakage current (i.e., iso-$I_{off}$) across a range of temperatures values (K) (e.g., from "room temperature" (i.e., ambient temperature, approximately 288K-300K)) to cryo-temperatures (i.e., approximately 100K-120K))). The graph 500 provides normalized cell delay (with reference to T=300K) from 0 to 1 on the Y-axis 510 and temperature (K) from 100K to 300K on the X-axis 520. On the graph 500, four bars (i.e., 532, 534, 536, 538) are provided for each respective temperature 300K, 200K, 150K, and 100K. As illustrated, there are 24%, 31%, and 38% reductions in normalized cell delay at each successive lower temperature.

Figure 6:
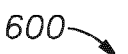
FIG. 6 is a flow chart illustrating certain aspects of various implementations described herein.

Referring to FIG. 6, a flow chart of an example operational process-tuning method 600 is shown. As illustrated, the flow chart 600 corresponds to an operation to adjust (i.e., "tune") threshold voltage (VTH) and operating voltage ($V_{DD}$) (i.e., supply voltage) for low-temperature design. In particular, the inventive methodology includes adjusting certain parameters through process-tuning in a transistor to incrementally "tune" for a particular temperature point and obtain an optimal performance for each temperature point. Advantageously, in various implementations, the method 600 may flexibly account for power and leakage requirements of a computer or memory architecture in real-time. The method 600 may be implemented with reference to a computer system as described with reference to FIG. 40.

At step 610, at room temperature ($T_{room-temperature}$) (e.g., between approximately 288K-300K), each of the different tuning control parameters (i.e., variables, metrics) of a transistor (e.g., operating voltage ($V_{DD}$), leakage current ($I_{off}$), drive current ($I_{on}$), and input/total gate capacitance ($C_g$)) may be available for adjustment (i.e., manipulation) at initial room temperature settings. In various implementations, the transistor may be either a planar device or a FinFET device. In certain cases, an example initial operating voltage may be set at 0.8V.

At step 620, the transistor device may be cooled to a specified lower temperature (i.e., below a temperature threshold, $T_{cold}$) (e.g., one of approximately 200K, 150K, or 100K). Due to the decrease in temperature, at $T_{cold}$, the leakage current ($I_{off}$) of the transistor device also decreases to a new significantly reduced leakage current ($I_{off\,new}$) (i.e., a second leakage current). Also, at this stage, increases in both threshold voltage ($V_{TH}$) and mobility would be observed.

At step 630, the threshold voltage ($V_{TH}$) is decreased until the second leakage current corresponds to (i.e., is equivalent to, matches) (e.g., $I_{off\,new}=I_{off}$) or is a factor (e.g., $I_{off\,new}>I_{off}$) of the first leakage current ($I_{off}$). At this lowered $V_{TH}$, the physical observed attributes include an increased drive current (ON-current, $I_{on}$) (as described with reference to FIGS. 4 and 5) and mobility (M). Moreover, at the lowered $V_{TH}$, the input gate capacitance ($C_g$) would also be increased (as described with reference to FIG. 3). As a result, increased switching power would be also be realized as well as short-circuit energy due to increases in drive current ($I_{on}$), input gate capacitance ($C_g$), and faster input slew. For instance, the inventive EDA tools (as described herein) can optimize circuit paths depending on each gate and its input and output. Accordingly, a faster input slew may not be guaranteed throughout the design, but on the whole, the loading (capacitance) in the design may be expected to increase. In certain cases, this would be due to Vth tuning and increases in peak current of each gate. Correspondingly, the result would be more dynamic power (based on switching power which is proportional to $CV^2*f$ and short-circuit power which is based on input slew and output load).

Advantageously, the step 630 (i.e., reduction of the $V_{TH}$) would not have been considered for room temperature devices because in doing so, the current leakage would rise significantly. Hence, such a design option is now only available at low or very low temperature operation (e.g., super-cooled and cryo-cooled temperatures).

In further cases, $V_{TH}$ at low temperature may be reduced below a point to exceed room-temperature leakage current of LVT. Such an optimization can be performed to achieve a superior metric (like PPA/power-delay product/total power (total power=static+dynamic power) or application-specific optimizations), where the impact on leakage current (>room temperature leakage) by reducing Vth can be recovered by improvements in performance or total power at a circuit-/system-level. Advantageously, such a "return on investment" (ROI) benefit on worse leakage would not even be possible at room-temperature designs.

In certain implementations while optimizing for high performance applications/systems (and in contrast to room temperature circuit designs), advantageously, lowering the threshold voltage $V_{TH}$ to a new lowered threshold voltages ($V_{TH}$) at lower temperatures (i.e., below the temperature threshold) would either provide substantially the same static power (iso-static power) or the similar total power (static and dynamic power). Moreover, multi-VT ($V_{TH}$) libraries would be utilized for the maintenance of dynamic power. For instance, if only one set of libraries (having optimized VT) were utilized, power usage would increase by approximately two times.

In certain implementations, while optimizing for low power applications/systems, at step 640, the methodology further includes: decreasing a supply voltage ($V_{DD}$) of the transistor device along with the threshold voltage ($V_{TH}$) (as a function of $V_{DD}$) to respective minimum voltages (i.e., a lowest point) while achieving substantially the same leakage current, the performance/watt (i.e., (1/energy) metric) (e.g., maximum clock frequency), and an area (i.e., a cell area) for the temperature below the temperature threshold ($T_{cold}$) (e.g., super-cooled and cryo-cooled temperatures) (and the plurality of room temperatures ($T_{room-temperatures}$) (e.g., between approximately 288K-300K). In certain cases, $V_{TH}$ at low temperature may be reduced to substantially correspond to (i.e., similar order of magnitude) room-temperature leakage current of LVT. However, to manage short circuit power and the switching power that increases due to higher Ion/Cg/slew at low-T, a new $V_{TH}$ ($V_{TH}$_lowleak) can be defined for each temperature point to manage power for devices in non-critical paths.

Advantageously, these implementations may significantly reduce dynamic power (i.e., ~$C^*V_{DD}*f$) (including dynamic power, including switching power, short-circuit power and interconnect power) and static power. Moreover, for such designs, multi-$V_{TH}$ libraries would also not be required/possible, as the lowest $V_{TH}$ would already be utilized to achieve minimum overdrive for reliable transistor switching. As an additional advantage, this flexibility and optimization would also not be possible with room-temperature designs.

Figure 7:
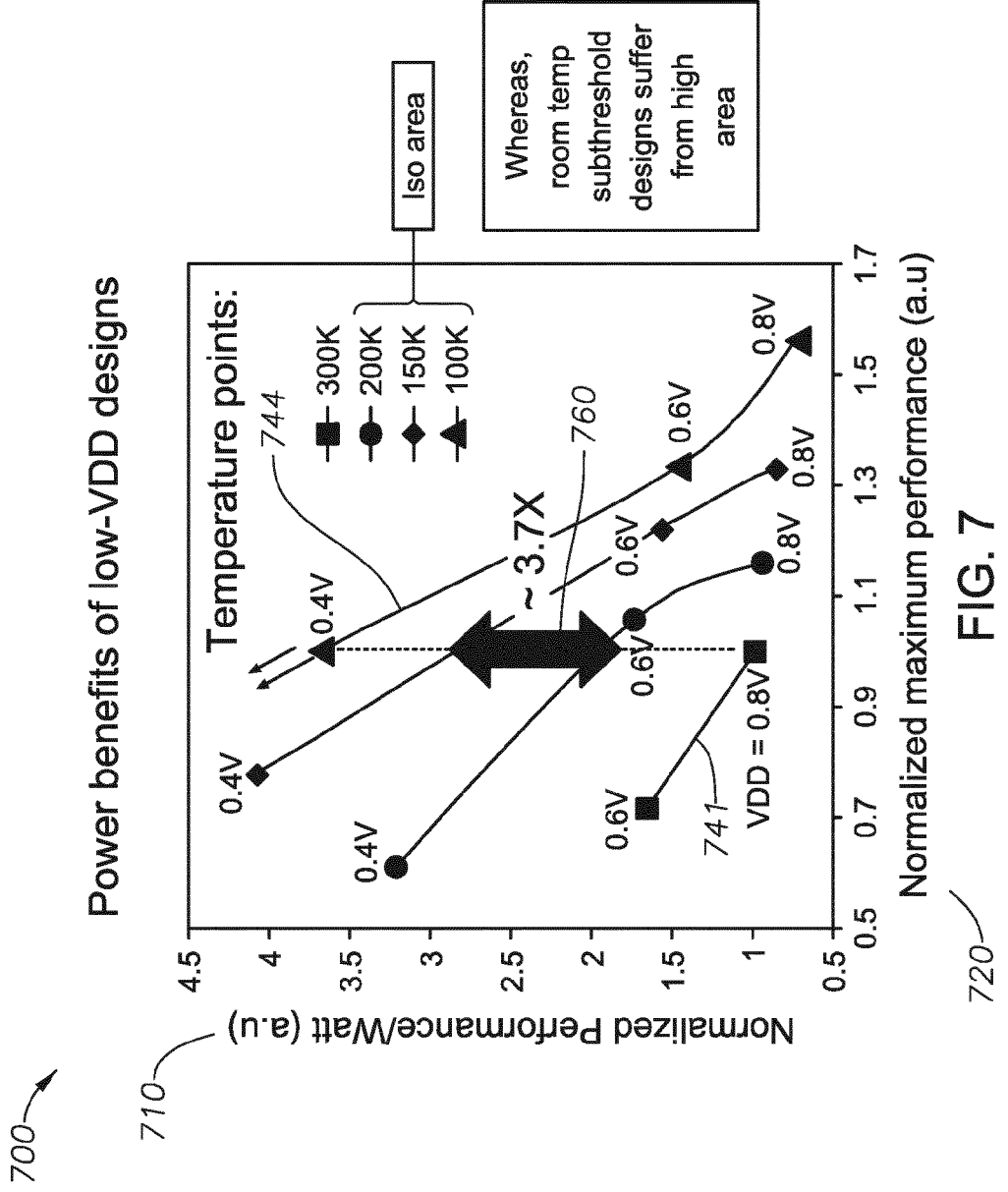
FIGS. 7-10 are exemplary graphs illustrating certain aspects of various implementations described herein.

Referring to FIG. 7, an example graph 700 according to example implementations is shown. As illustrated, FIG. 7 depicts a graph 700 representing the power benefits of low-operating voltage ($V_{DD}$) designs at incrementally lower temperatures (e.g., 300K, 200K, 150K, 100K). The graph 700 provides normalized performance/Watt (a.u.) from 0.5 to 4.5 on the Y-axis 710 and normalized maximum performance (a.u) from 0.5 to 1.7 on the X-axis 720. On the graph, the line 741 corresponds to supply voltage ($V_{DD}$) at room temperature (e.g., 300K) while the line 744 corresponds to a cryo-cooled temperature (e.g., 100K). As an example, the "double arrow" line 760 represents that the same normalized maximum performance of "1" for each of the temperature points: 300K, 200K, 150K and 100K. As would be appreciated, the same normalized maximum performance may be realized but at an approximately 3.7× normalized benefit in performance/watt. Advantageously, by operating at the lower temperature, 100K, $V_{DD}$ may be reduced to 0.4V, whereas, in contrast, the room temperature device would have to run at 0.8V to obtain the same maximum performance (i.e., maximum clock, design frequency).

Advantageously, in certain implementations, inventive aspects include the capacity to find a temperature "sweet spot" for optimal transistor or data center operation. Based on various metric (as described herein) an optimal temperature value may be determined for but not limited to NMOS and PMOS devices and complementary logic (e.g., due to low leakage, but in other implementations other logic may be utilized that would not be necessarily be complementary logic).

Figure 8:
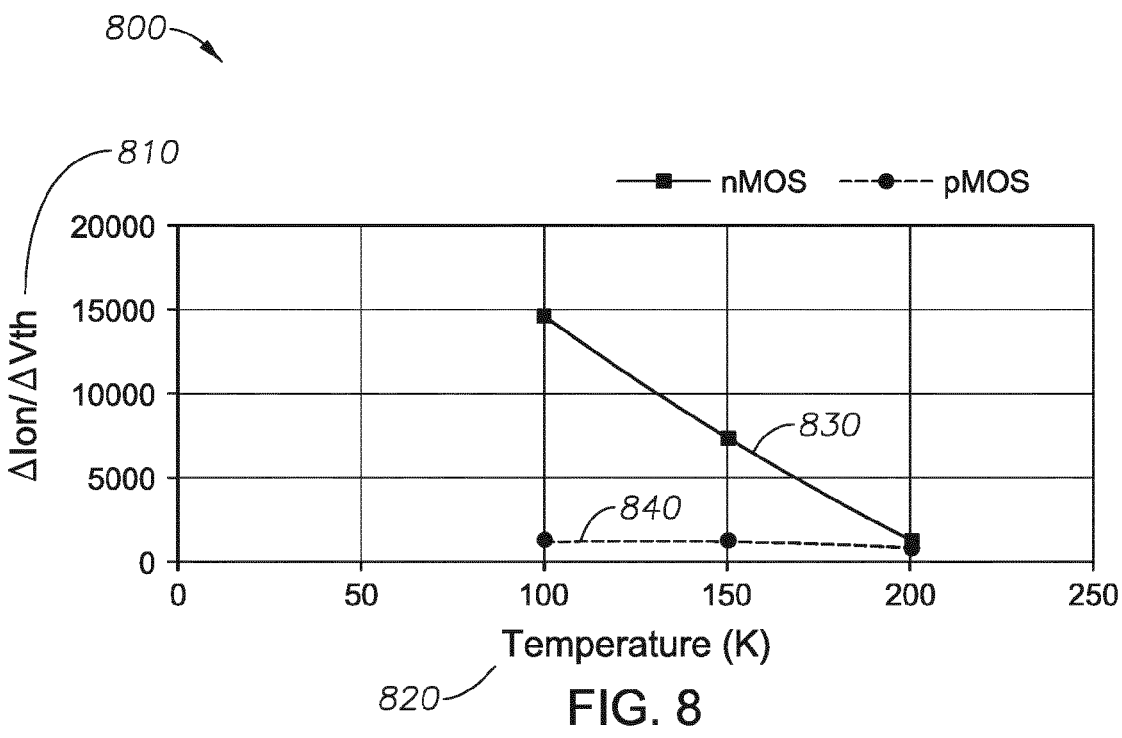

Referring to FIG. 8, a graph 800 for selecting an ideal temperature operating point (i.e., a cooling temperature parameter, optimal point) using a first metric (i.e., $\Delta I_{on}/\Delta V_{TH}$) according to an example implementation is shown. As illustrated, FIG. 8 depicts a graph (i.e., operating map) representing how much change in threshold voltage $V_{TH}$ ($\Delta V_{TH}$) is required to achieve the same leakage current ($I_{off}$) at 300K (as room temperature) versus gain in drive current ($I_{on}$, ON-current). The graph 800 provides the change in ON-current ($\Delta I_{on}$) as a function of the change in in $V_{TH}$ ($\Delta V_{TH}$) from 0 to 20,000 on the Y-axis 810 and temperature (K) from 0K to 250K on the X-axis 820. As depicted, on the graph 800, an operating curve 830 is shown for an NMOS transistor device and an operating curve 840 is shown for a PMOS device.

Advantageously, the graph 800 represents how much threshold voltage would have to be "tweaked" to realize a worthwhile ROI from ON-current. As discussed, the higher the ON-current, the better the performance. However, for instance, if the "tweak" of threshold voltage ($V_{TH}$) is significant for a small difference in ON-current, then an adjustment of threshold voltage may not be an efficient optimization. Also, as may be appreciated from FIG. 8, at the same-leakage across the temperature range, while the NMOS device would be "stronger" than the PMOS device, the PMOS device would be more leakage optimized. Accordingly, the first metric, $\Delta I_{on}/\Delta V_{TH}$, is demonstrated to be greater for NMOS devices (e.g., for NMOS finFET devices) in comparison to PMOS devices (e.g., for PMOS finFET devices). Also, as observed from the operating map 800, the first metric, $\Delta I_{on}/\Delta V_{TH}$ for PMOS devices would commence saturation at 100K, and the optimal temperature point range would be between approximately 150K. In contrast, NMOS devices are shown to have better $\Delta I_{on}/\Delta V_{TH}$ as the temperature is cooled further.

It is further noted that the findings as described with respect to FIG. 8 are specific to one particular technology node, and such findings (and resulting trends) may largely vary from node-to-node. As an example, for older processes, NMOS was determined to provide better performance with increased $I_{on}$, and would be "stronger" in comparison to PMOS. Moreover, NMOS delay or PMOS delay would also vary from node-to-node. As an example, the inventive experiments are performed on a 14 nm FinFET node, and such finding may differ in future advanced node (e.g., 3 nm), and from older planar technologies.

Further, another consideration may also be taken into account; namely, the impact of the "cost" factor (i.e., cost element) as well. For example, currently, the cost to cool down memory devices to 100K would be significant. As an example, such costs would include the cost to cool down the entire chip. In other examples, for a datacenter implementation, there may be a cooling at the room level that would eventually maintain the on chip junction temperature to the target super-cooled or cryo-temperatures. Hence, taking into account such a cost factor may determine that a temperature around 150K may be most optimal.

Figure 9:
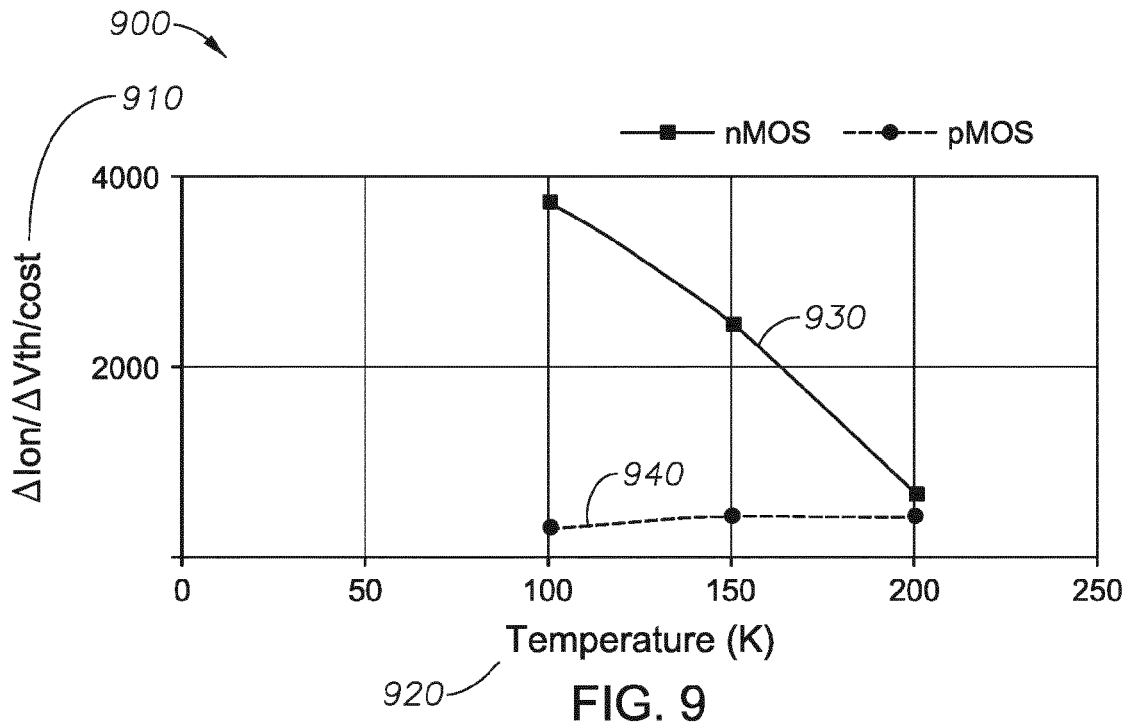

Referring to FIG. 9, a graph 900 for selecting an ideal temperature operating point (i.e., a cooling temperature parameter, optimal point) using a second metric (i.e., ($\Delta I_{on}/\Delta V_{TH}$/cost) according to an example implementation is shown. As illustrated, FIG. 9 depicts a graph (i.e., operating map) that expands from the graph 800, and further takes into account a return-on-investment (ROI) on the cooling investment: ($\Delta I_{on}/\Delta V_{TH}$/cost). The graph 900 provides the cooling investment (i.e., change in ON-current ($\Delta I_{on}$) as a function of the change in $V_{TH}$ ($\Delta V_{TH}$), and as a function cost) from 0 to 4000 on the Y-axis 910 and temperature (K) from 0K to 250K on the X-axis 920. As depicted, on the graph 900, an operating curve 930 is shown for an NMOS transistor device and an operating curve 940 is shown for a PMOS device.

As observed from the operating map FIG. 9, for instance, an operating point (i.e., a cooling temperature parameter, optimal point), taking into account an optimal cooling investment ($\Delta I_{on}/\Delta V_{TH}$/cost) that is relatively "high", may correspond to a temperature reduced below 150K for both NMOS and PMOS devices (e.g., an average of the two temperatures 100K and 150K). Hence, in such an example, while a temperature operating point of a 150K may seem optimal, the ROI would be reduced below 150K (for both NMOS and PMOS devices).

In certain cases, such an optimal point would be dependent on the targeted technology and the fabrication plant (i.e., foundry), especially with regard to $\Delta V_{TH}$ (as transistors requires additional processes on their respective gates to achieve a larger threshold voltage). Hence, it may be more expensive to reduce the threshold voltage. Accordingly, with the exception of silicon-on-insulator (SOI) devices, temperature sensitivity may change for each foundry and each process node due to their "recipe" of the materials being used (i.e., the processing steps). Thus, both the temperature sensitivity of mobility and threshold voltage can change based on the particular foundry.

Going further, beyond the foundry, in certain implementations, cost elements involve the actual costs of cooling during operation and the designated target junction temperature. For instance, such costs may include the operating costs that are considerations (i.e., variables) that a system designer or data center designer would have to determine. Correspondingly, a consideration may be: how much performance improvement (i.e., ROI) may be realized in comparison to how much does it take (i.e., cost) to cool down an entire data center down to, for example, 150K or 100K. Such a consideration can be significant and not negligible.

Thus, in certain cases, then optimization methodology utilizing the second metric ($\Delta I_{on}/\Delta V_{TH}$/cost) may include considerations such as: one or more of the foundry, the design, and application of the transistor combined together. In an example, with reference to an assumed cost in a demonstration at 200K for temperature, the cost would grow two times as originally expected (i.e., 2×). (In one example, cooling power may be defined as a multiple (n) of the dynamic power of the semiconductor chip (X). Hence, total power=(n+1)*X and n grows for lower temperatures (e.g., below 200K). However, cooling power generally would depend on cooling efficacy: the dynamic power and the cooling efficiency of the cooling system to get to the target temperature.) Correspondingly, if the dynamic power consumption of the core (e.g., transistors in a data center) is 1×, then two times (2×) would be spent for cooling. Hence, the total power spending in the data center would be 3× (i.e., 2×+1× power dissipation) at 200K. Similarly, in other examples, for an assumed cost at demonstration of 150K, the cost would be three times as expected (i.e., 3×); and at 100K, the cost would be four times as expected (i.e., 4×). Accordingly, optimization consideration would be based on the tradeoff between performance and cost for temperatures 200K down to 100K.

In one implementation, the selection of an ideal temperature operating point (i.e., a cooling temperature parameter, optimal point) may be based on a third metric (proportional to $C_g*V_{DD}/\Delta I_{on}$). For instance, the third metric can be an intuitive delay metric corresponding to gate capacitance ($C_g$) multiplied by operating voltage ($V_{DD}$), the product of which is divided by the change in the ON-current ($\Delta I_{on}$)). Such a delay metric corresponds to the RC (Resistor-Capacitor) in the tuning of the device to obtain a greater ON-current ($I_{on}$), but in doing so, concurrently, the gate capacitance ($C_g$) would also rise. Accordingly, for such a delay metric ($C*V_{DD}/\Delta I_{on}$), while $V_{TH}$ tuning would improve $I_{on}$, gate capacitance ($C_g$) would get worse.

In yet another implementation, the selection of an ideal temperature operating point (i.e., a cooling temperature parameter, optimal point) may be based on a fourth metric ($C*V_{DD}/\Delta I_{on}*CV^2$), a delay-energy product metric. In such a metric, $V_{TH}$ tuning and $V_{DD}$ tuning can be utilized to optimize an energy-delay product at each temperature to find an optimal temperature. Accordingly, the metric is an indication of power dissipation of the transistor itself (and not a system optimization).

In other implementations or in combination with the above metrics (as described herein), supply voltage and process expenditure can also be metrics utilized for the selection as well to achieve tweaks in $V_{TH}$. Furthermore, in response to determining cooling temperature parameter, the tool 4024 or computer system 4000 (e.g., with reference to FIG. 40) may generate a temperature-based transistor device profile. Also, the tool 4024 or computer system 400 may reduce a cooling temperature of one or more transistors based on the generated temperature-based transistor device profile.

Temperature reduction to supercooled and cryo-cooled temperatures for transistor devices may also be applied to interconnect materials (e.g., copper, aluminum, cobalt, etc.) (e.g., an integrated circuit including one or more of memory and/or logic devices). Advantageously, inventive aspects include utilizing the electrical, manufacturing, and/or reliability properties of different interconnect materials (e.g., copper, aluminum, cobalt, etc.) or metal levels at low temperatures (e.g., below 200K) (i.e., one or more interconnects or metal layers) for optimization of integrated circuit back-end-of-line (BEOL) and interconnect operation at such low temperatures. In one implementation, as a further advantage, at advanced nodes and at T less than 200K, the use of certain material (e.g., aluminum) (or combination thereof) wires for local and intermediate-level interconnects can provide up to four times (4×) casing (e.g., in comparison between aluminum and copper) in wire and via resistance and also improve system-level power, performance, and area (PPA) (by taking advantage of improved reliability properties of materials at lower temperatures (as described herein)).

As one example, while aluminum has historically been used as an interconnect material, in recent years, at more advanced semiconductor manufacturing nodes, it has been largely replaced by copper (and other metal options like cobalt and ruthenium in the research pipeline) due to unreliable electromigration properties for advanced nodes. As defined, electromigration is a function of current density, cross-sectional-area/dimension, material activation energy, fabrication quality, time, frequency, and temperature. As an example, electrons would "pummel" aluminum (Al) atoms out of position, which can cause voids and disconnects. At lower temperature (e.g., below 200K), it is harder to move the atoms, and thus, Al can support higher current densities than at room temperature.

Hence, at low temperature ranges (as discussed herein), aluminum can be utilized in safe electromigration regions or provide reasonable EM characteristics, similar to that offered by room temperature copper metals as required by target applications. Accordingly, in certain cases, as inventive aspects provide that electromigration is no longer a problem, aluminum (or another material utilizing the electrical and/or the reliability properties) may be utilized for back-end-of-the-line metals (e.g., local and intermediate metal levels) instead of copper wires at temperatures below a critical temperature point (i.e., a temperature threshold), e.g., 200K (by providing electrical/resistance/performance benefits over classical room-temperature metal alternatives). As one would appreciate, aluminum is one example of a metal material where reliability fails for room temperature operation (e.g., approximately 288K-300K) in advanced nodes. Nevertheless, aluminum, now according to inventive aspects can be an option for dedicated low temperature design (e.g., below 200K). Moreover, other materials with the same or similar reliability properties may similarly be applied for the inventive schemes and techniques.

Figures 10, 11:
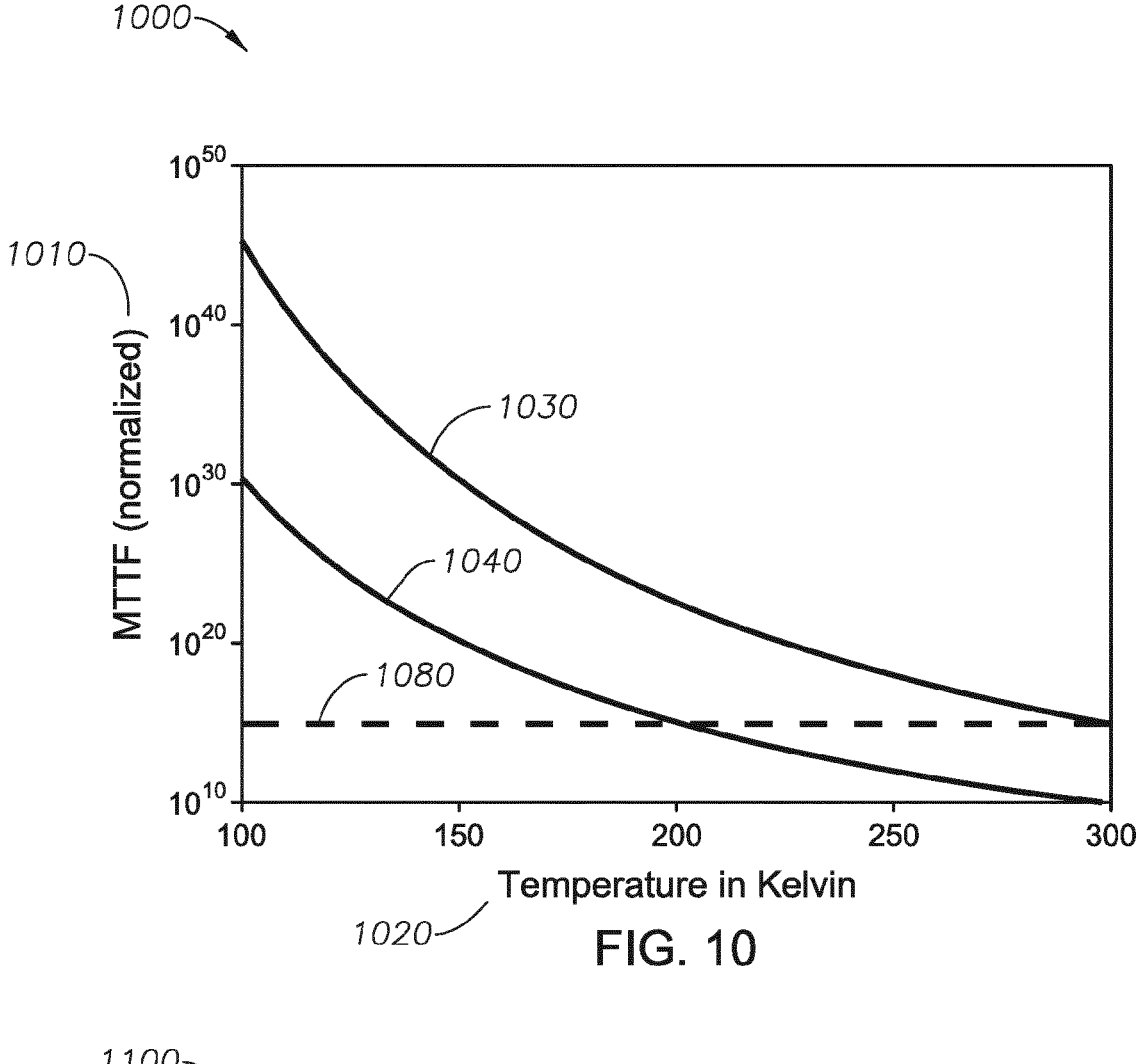
FIG. 11 is an example chart illustrating certain aspects of various implementations described herein.

Referring to FIG. 10, a graph 1000 according to an example implementation is shown. As illustrated, FIG. 10 depicts a comparison of two example interconnect materials, copper (Cu) and aluminum (Al) based on a normalized estimated mean-time-to-failure (MTTF) from $10^{10}$ to $10^{50}$ (on the Y-axis 1010) over a range of temperatures (on the X-axis 1020) from 100K to 300K. On the graph 1000, a curve 1030 is shown for copper, and a curve 1040 is shown for aluminum. As may be readily appreciated, at an operation with a temperature of 200K, aluminum has substantially the same MMTF (e.g., a MTTF minimum threshold value $10^{15}$ (dashed-line 1080) as copper does, at 300K (approximately room temperature)). Hence, for advanced process nodes (e.g., 5 nm wiring), at low and very low temperatures (e.g., below 200K), in one example, aluminum would be a better choice for interconnect material instead of copper.

Referring to FIG. 11, a table 1100 according to an example implementation is shown. As illustrated, e.g., at 300K (approximately room temperature), aluminum exhibits resistance growth for advanced process nodes (e.g., 5 nm wiring). For instance, aluminum provides approximately 1000 Ω/μm, (a significant resistance) for the M1-M3 metal layers (e.g., local and intermediate metal levels) in comparison to 82 Ω/μm for M4-M6 metal layers, and 20.4 for the M7-M19 metal layers. Accordingly, there is likely significant benefit from a resistance perspective for aluminum in contrast with copper, which exhibits barriers and lining that may consume away from the metal/conductor cross-sectional area. In one example, for instance, copper metals used in the BEOL process would require a barrier and liner around it to prevent these materials from diffusing into the surrounding dielectric in the BEOL, stack, when exposed to heat either during manufacturing or during operation. At advanced nodes, the cross section of the wire is small, and the barrier/liner consume a substantial part of this area;

because the barrier/liner is not conducting like the copper metal itself, the overall resistance of the wire would increase substantially. In contrast, other materials such as aluminum would not have this requirement and hence are useful at advanced nodes, especially, at low temperatures that boost their reliability properties.

Figure 12:
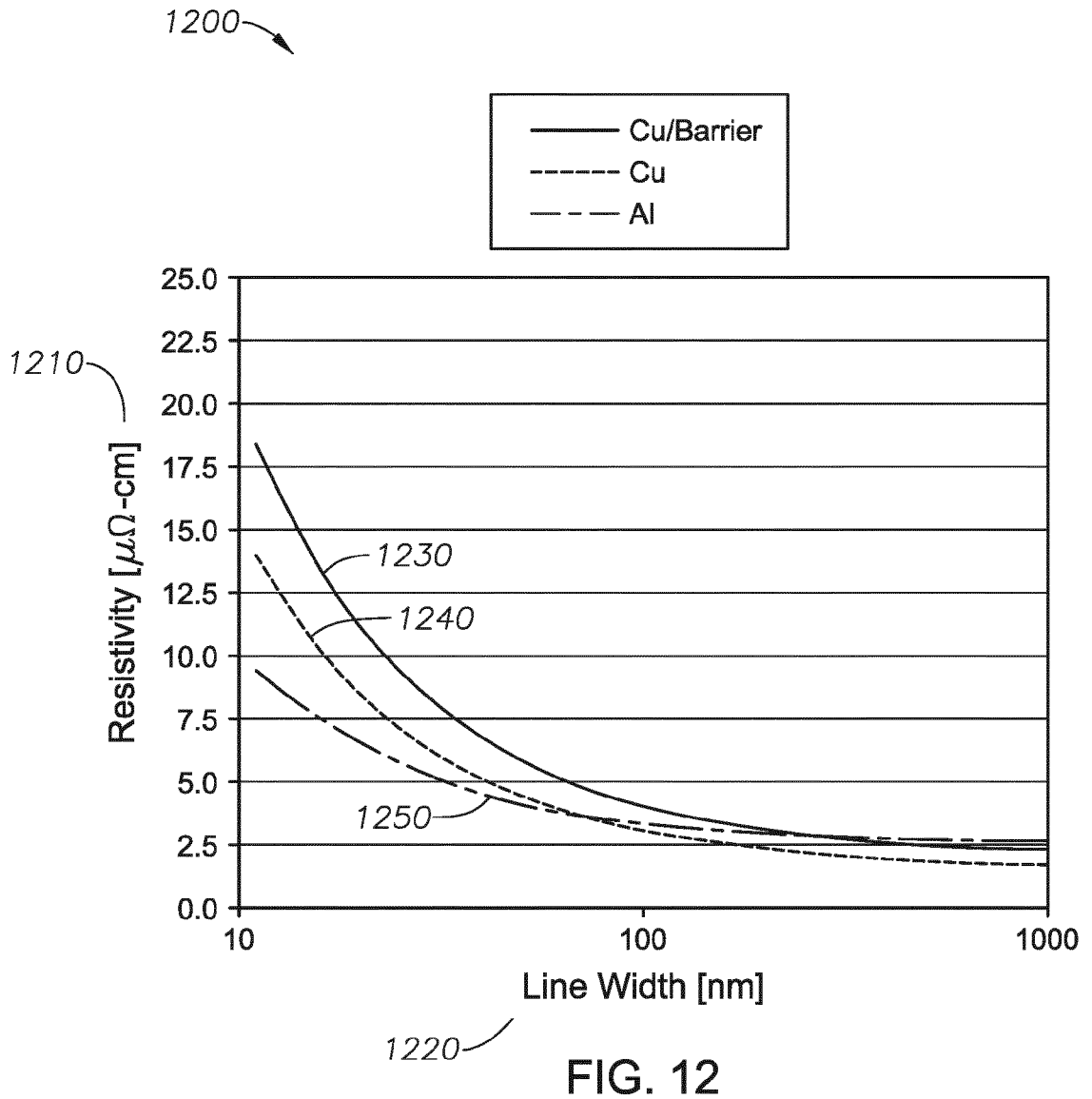
FIG. 12 is an exemplary graph in accordance with various implementations described herein.

Referring to FIG. 12, a graph 1200 according to an example implementation is shown. As illustrated, FIG. 12 depicts a comparison of resistivity ($\mu\Omega$-cm) (on the y-axis from 0 to 25) of copper (Cu), aluminum (Al), and copper barrier (Cu/barrier) as a function of line width (nm) (on the x-axis from 10 to 1000 nm). On the graph 1200, a curve 1230 is shown for copper barrier, curve 1240 is shown for copper, and a curve 1250 is shown for aluminum. As may be readily appreciated, for aluminum, the resistivity is substantially lower. In addition, with respect to the graph 1600, certain characteristics include: that there may be lower size effects for Al, but electromigration would still be an issue at room temperature; the activation energy (Ea) for aluminum (Al) may be at least approximately 0.6 eV; the activation energy (Ea) for copper (Cu) may be approximately 0.9 eV (A=1, N=1); the MTTF is approximately exp (Ea/kT); the copper barrier/linear thickness is equal to 2.5 nm, and the aluminum barrier/linear thickness is approximately equal to 1 nm (where such numbers may have been improved upon by foundries).

Figure 13A:
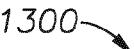
FIGS. 13A-13B are example charts illustrating certain aspects of various implementations described herein.
Figure 13B:

Referring to FIGS. 13A-13B, tables 1300 and 1350 according to example implementations are shown. As depicted, table 1300 provides characteristics of an example 5 nm copper wiring BEOL, while table 1350, according to inventive aspects, provides characteristics of a proposed 5 nm aluminum wiring BEOL at a temperature less than 200K.

Figure 14:
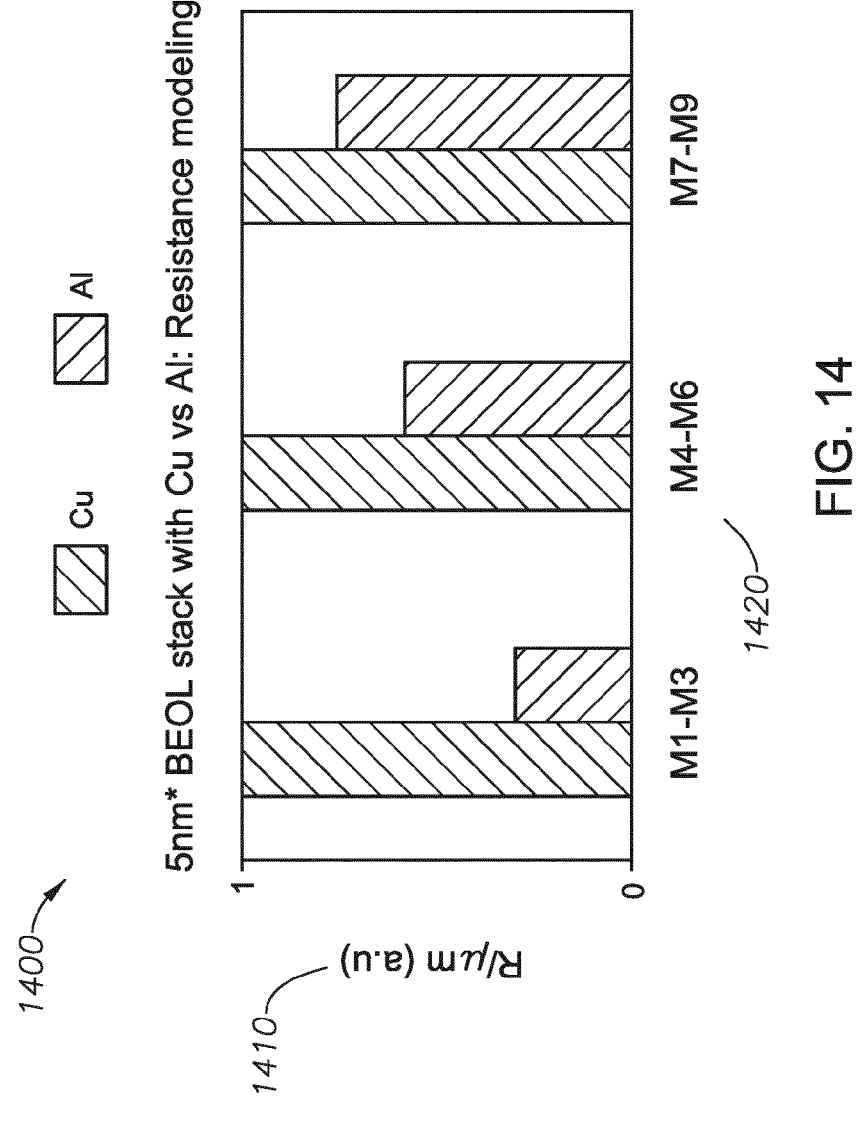
FIG. 14 is an exemplary graph in accordance with various implementations described herein.

Referring to FIG. 14, a graph 1400 according to an example implementation is shown. As illustrated, FIG. 14 depicts a comparison of resistance modeling (R) of the 5 nm BEOL stack with Cu (with reference to FIG. 13A) and the 5 nm BEOL stack with Al (with reference to FIG. 13B). The graph 1400 includes resistance modeling (R/$\mu$m (a.u) (on the y-axis from 0 to 1) 1410 and metal layers (e.g., local and intermediate metal levels) M1-M3, M4-M6, M7-M9 on the x-axis 1420. As may readily appreciated, aluminum is shown to improve resistance (R) by up to four times (i.e., 4x) that of copper.

In certain cases, inventive aspects include certain electrical performance, manufacturing performance, and reliability properties that can be realized at low temperatures (i.e., below 200K). Advantageously, at such low temperatures, any particular metal may be utilized as long as such properties are satisfied. For instance, as an example, certain metals may be selected based on the following procedure and selection criteria: 1) to make sure that the selected metal is in a "safe" electromigration (EM) zone, filter out the metals that are not "EM safe" 2) and select the one or more materials that are above a certain resistance modeling threshold level. As a definition, electromigration is a reliability property of metals/wires and vias in the design. Over a period of time, if there is a high current that flows in the wire/via that has high resistance, the copper/wire atoms may drift in the direction of the current and result in ultra-high resistance/breakage of the wire/via rendering the design unusable after a period of time. EM safe may be defined as when the selected material is designed to operate reliably for a targeted lifetime. Further, in some implementations, the reliability properties may include a gating factor to achieve high frequency in advanced nodes.

According to some implementations, with reference at least the above paragraphs and FIGS. 10-20, an integrated circuit includes one or more of memory and/or logic devices, and/or one or more interconnects or metal layers, where the one or more interconnects or metal layers are formed of a material based on predetermined properties at a temperature below a temperature threshold.

In some implementations, with reference at least the above paragraphs and FIGS. 10-20, barrier/liner materials and/or dielectric materials in the back-end-of-the-line stack may also be formed of one or more materials based on predetermined properties at a temperature below a temperature threshold.

In one example implementation, a selection of a BEOL stack material may be a combination (i.e., "mix") of materials. For example, instead of all copper metals or all aluminum, a hybrid selection of various materials (as described herein) may be used for different metal layers.

In some implementations, with reference at least the above paragraphs and FIGS. 10-20, the predetermined properties comprise one or more of: an electromigration below an electromigration threshold; a resistivity below a resistivity threshold; one or more of a barrier, liner or metal-capping layer requirement configured to maintain reliability below an interconnect and dielectric reliability threshold; or a time-dependent-dielectric-breakdown (TDDB) below a TDDB threshold.

Advantageously, certain implementations allow for the capacity for a circuit design and electronic automation (EDA) tool 4024 (as described with reference to FIG. 40 for placement, routing, optimization, etc.) to select from a range of materials based on the above-mentioned favorable properties. Moreover, such an EDA tool 4024 may provide generated computer-aided physical layout designs for computer (memory and logic) architecture.

In certain implementations, inventive aspects provide the capacity to optimize wire geometry utilized in stack materials to take advantage of resistor-capacitor (RC) increases in aggregate for power and performance at low temperatures. Advantageously, inventive aspects include RC optimization of wires by varying width (W), spacing (S), and thickness (T) at low-temperatures (below 200K) by taking advantage of lower resistance (e.g., with reference to FIGS. 19A-19B) and lower time-dependent-dielectric-breakdown (e.g., with reference to FIGS. 20A-20B).

Figure 15:
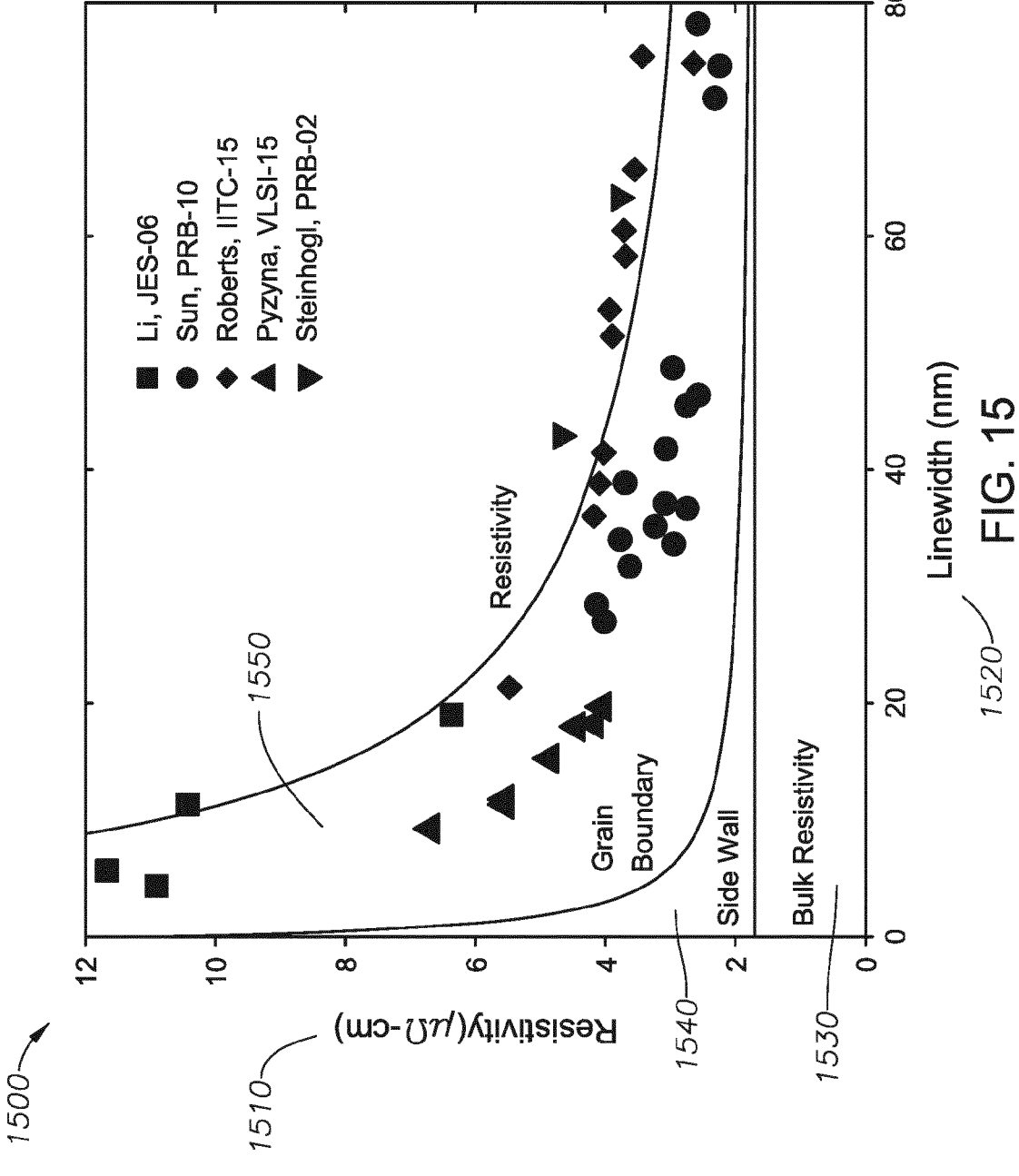
FIGS. 15-17 are exemplary graphs in accordance with various implementations described herein.

Referring to FIG. 15, a graph 1500 is shown. As illustrated, FIG. 15 depicts a comparison of copper resistivity and its corresponding line width. The graph 1500 includes the copper resistivity ($\mu\Omega$-cm) (on the y-axis from 0 to 12) 1510 and line width (nm) (on the x-axis from 0 to 80) 1520.

As may readily appreciated, for advanced nodes, resistivity "shoots up" at decreasing linewidth. As shown the bulk resistivity 1530 is shown to be "steady" for the entire range of linewidth. In contrast, the "size effects" (as illustrated by the resistivity of side walls 1540 and grain boundary 1550) increases significantly at lower linewidth). As illustrated, the size effects are generated by the liners/barriers on the boundaries of the conductor/material (e.g., copper) and the surrounding dielectric material in the back-end-of-line (BEOL) stack to make it reliable. For instance, as each material is placed, a sidewall is created that can change the way electrons travel through the metal. Hence "scattering events" occur due to the sidewall and metal grain boundaries that form when the material is deposited. Correspondingly, at "very small" (below 20 nm) material wiring lines, such size effects grow exponentially, and hence, an overall resistivity would also grow exponentially. In one example, copper may be a "great" conductor; however, in comparison, copper adjacent to tantalum or tantalum nitride (e.g., as used in barriers and liners) would not be ideal. This may be the case, especially in instances where the designer/manufacturer would attempt to "squeeze" (e.g., place less copper for the wiring) to ever smaller dimensions.

Figure 16:
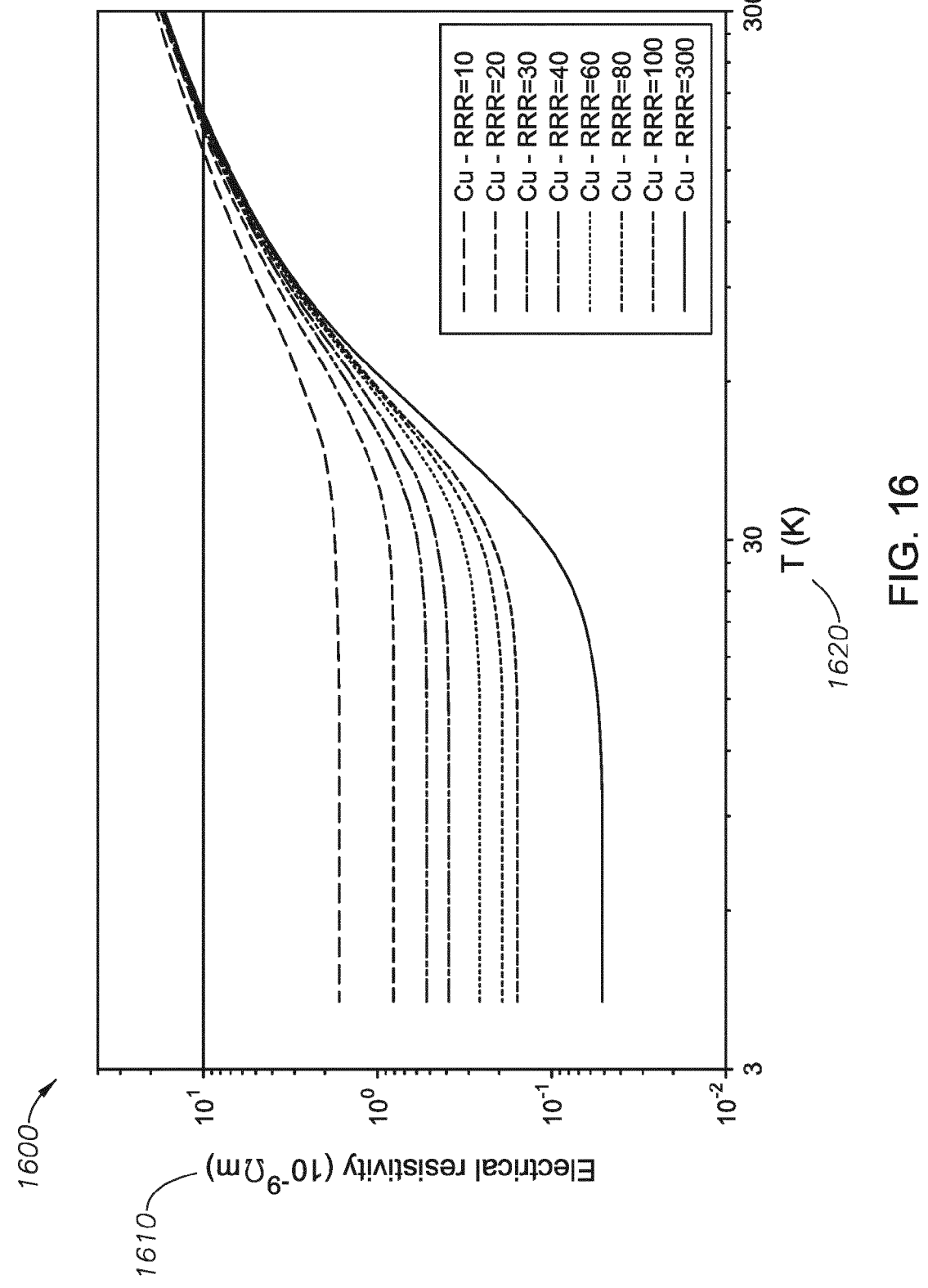

Referring to FIG. 16, a graph 1600 is shown. As illustrated, FIG. 20 depicts a comparison of electrical resistivity (ρ) of an example material copper over a range of temperatures. The graph 2000 includes electrical resistivity (ρ) ($10^{-9}$ Ωm) (on the y-axis from $10^{-2}$ to $10^{1}$) 1610 and temperature (K) (on the x-axis from 3 to 200) 2020. As may be appreciated, the graph 1600 depicts "squeezing out" a greater improvement from an example copper material. For instance, with respect to advanced nodes, any incremental improvement would be beneficial (e.g., even a 5% gain). As can be determined, the overall improvement in resistivity due to temperature reduction reduces at advanced nodes; as such, it is less beneficial.

In characterizing the copper wiring, impurities and crystallographic defect content are indicated by RRR. As illustrated in FIG. 16, the more the impurity there is, the higher the resistivity. As shown, resistivity (R) would be equal to the highest impurity (i.e., an impurity factor). Accordingly, as temperature would be lowered from 300K to 100K, the bulk resistivity would also reduce. In one example, for copper, bulk resistivity may reduce, but the other two, side walls 1540 and grain boundary 1550 (from FIG. 15) would still be there.

Figure 17:
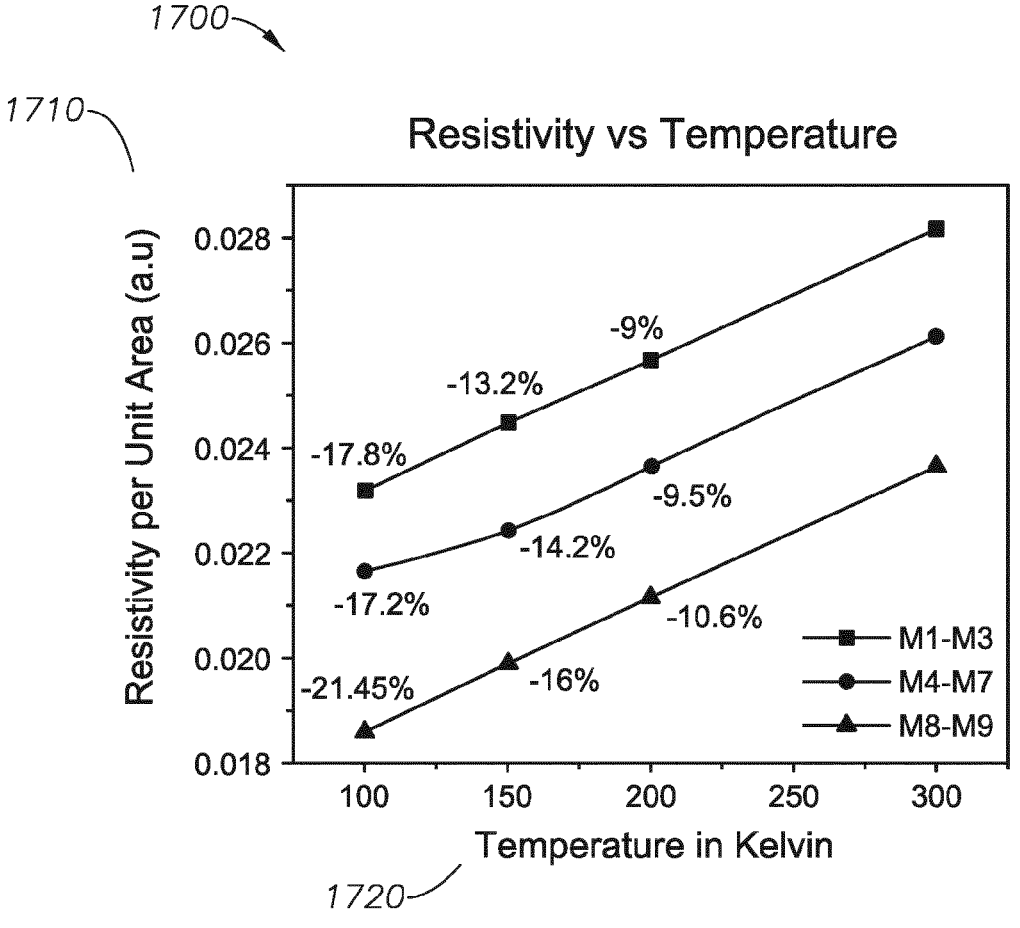

Referring to FIG. 17, a graph 1700 according to example implementations is shown. As illustrated, FIG. 17 depicts a comparison of resistivity of an example material of an advanced node (e.g., a FinFET device) over a range of temperatures. The graph 1700 includes resistivity per unit area (Ω/μm²) (on the y-axis from 0.018 to 0.028) 1710 and temperature (K) (on the x-axis from 100K to 300K) 1720. The graph 1700 also depicts resistivity curves of metal lines (i.e., metal layers) of a metal stack including M1-M3 layers, M4-M7 layers, and M8-M9 layers.

Advantageously, the inventive modeling in graph 1700 demonstrates that a significant 18-20% improvement is observed across the metal lines of the metal stack. Accordingly, this can be a significant improvement for advanced nodes. Moreover, as may be appreciated through the inventive modeling, the "scattering effect" and the exponential increase of resistivity would not change on the account of temperature. Hence, such contributions to an overall resistivity would be unaffected by any change to temperature.

Advantageously, as may be appreciated, each of the different wiring levels (i.e., metal layers) would have different temperature sensitivities. For instance, the M1-M3 wiring levels (e.g., with reference to FIG. 17) would have a different temperature response to low temperatures (e.g., below 200K), than the temperature response to the M4-M7 wiring levels, as well as a different temperature response to the M8-M9 wiring levels. Correspondingly, the different temperature sensitivities can be attributed based on, for example, each of the wiring levels having: different amounts of liner and different volumes of the material (e.g., copper) in the different wire lines.

Hence, each of the wiring levels would have different temperature sensitivities with respect to resistivity.

Accordingly, in certain aspects, schemes and techniques of the present invention provide for the capacity to manage and exploit temperature sensitivity and its corresponding relationship to wire geometry. In such cases, the wire geometry may be derived from the resistance curve (i.e., resistivity curve) for each particular wiring level (e.g., with reference to FIG. 17). Advantageously, the inventive aspects determine the temperature sensitivity aspect and its implication on various wiring, and optimize for PPA of the integrated circuit.

With reference to FIG. 17, in one example, the M1-M3 layers may be "tiniest" wires of the integrated circuit or system and are the most numerous. Due to their size, such M1-M3 layers would be the most difficult to transmit a larger current across it. In contrast, the M8-M9 metals are the "largest" wires and would be placed at the "top" levels of the integrated circuit or system, and would carry the larger current. Hence, for example, resistivity for such M8-M9 is significantly lower in comparison to the M1-M3 layers.

Similarly, for the M1-M3 layers, the capacitance is comparatively significantly lower than M8-M9 layers. For example, as M8-M9 layers would have wider and longer connections, the capacitance of such layer wires would be significantly higher. Hence, for logic circuits, transistor devices, BEOL of integrated circuits, there would be a trade-off between the device RC and the RC of the metal layer wirings. Such tradeoff considerations would be predicated on certain criteria including, but not limited to: where the transistor devices are "sitting" (i.e., positioned); what a circuit designer may be trying connect; and what particular metal type is being used.

Figure 18:
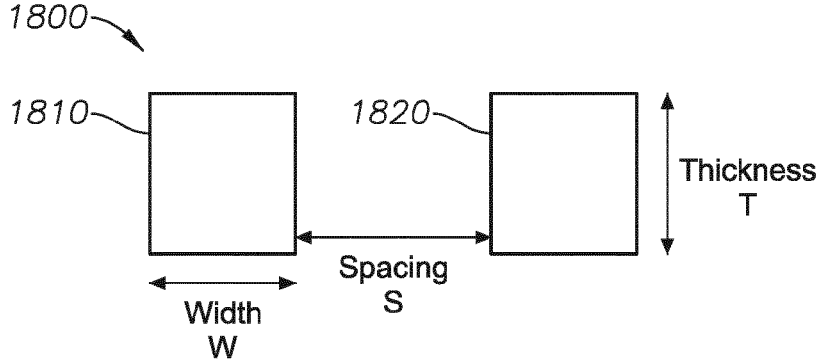
FIG. 18 is a diagram in accordance with various implementations described herein.

Referring to FIG. 18, an example representation 1800 is shown. As illustrated, FIG. 18 depicts a cross-sectional wire geometry of two example wiring lengths (e.g., copper) for operation at room temperature (e.g., 288K-300K) in integrated circuitry. For instance, in a BEOL stack, multiple wires are positioned orthogonal to one another, as wires are placed from one layer to the next. In FIG. 18, two parallel wires 1810 and 1820 are shown on the same layer adjacent to one another and positioned to extend in the Z-direction (i.e., inward and outward from the page). Each of the wires 1810, 1820 have a width (W) (i.e., in the X-direction) and a thickness (i.e., in the Y-direction). Also, the two wires 1810, 1820 would have a certain spacing(S) apart from one another. In certain implementations, the resistivity of each wire 1810, 1820 would be based on its rectangular area.

In comparison to FIG. 18 illustrating wire geometry at room temperatures (e.g., 288K-300K), certain adjustments to sizing can be performed at low temperatures (e.g., below a temperature threshold of 200K).

Figures 19A, 19B, 20A, 20B:
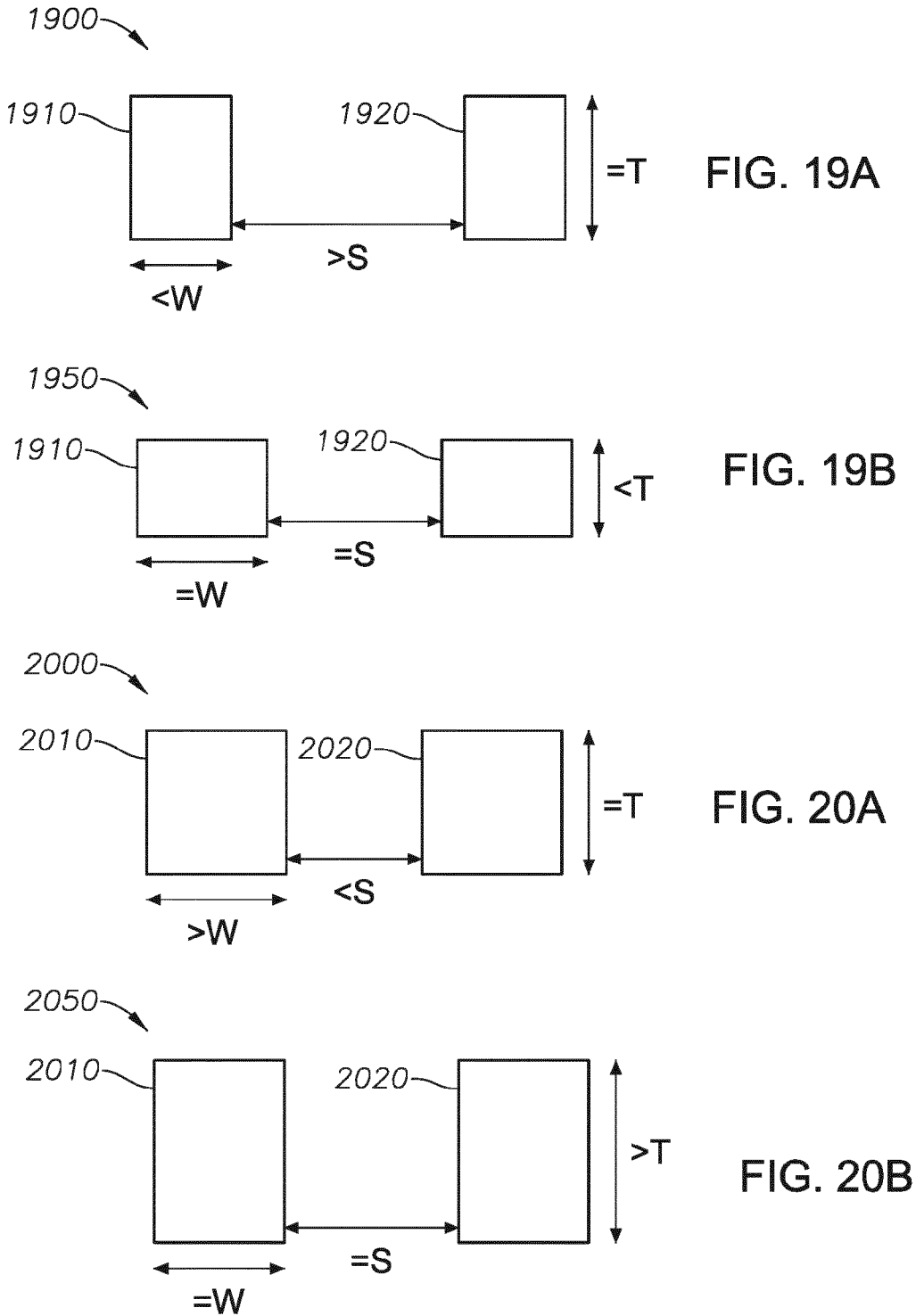
FIGS. 19A-19B are diagrams in accordance with various implementations described herein.
FIGS. 20A-20B are diagrams in accordance with various implementations described herein.

Referring to FIGS. 19A-19B, representations 1900, 1950 of example wiring geometry are shown according to example inventive implementations. As illustrated, FIGS. 19A-19B depict cross-sectional wire geometry 1900, 1950 of two example wiring lengths (e.g., copper, aluminum, etc.) for operation at low temperature (e.g., below 200K) in integrated circuitry. In certain implementations, FIGS. 19A-19B illustrate inventive low-temperature (e.g., below 200K) wire-geometry for capacitance-limited metal levels (e.g., M8-M9 layers) by offsetting resistance improvement (R) to improve capacitance (C).

For instance, as upper metal layers (e.g., M8-M9, global metal levels) are wide; wider than lower metal layers (e.g., M1-M3)), such upper metal layers may suffer from high capacitance, but their wire resistance would not be as problematic.

As one solution, in one implementation shown in FIGS. 19A, the widths (W) of the first and second wires 1910, 1920 may be decreased and correspondingly the spacing(S) between the first and second wires may be increased in comparison to the widths and spacing of similar wires at room temperature, while the thickness (T) would be substantially the same as that of similar wires at room temperature. Advantageously, while the reduction of the width (W)

of the wires in low temperature optimized design, effectively such a design would increase resistivity (however, at low temperatures this increase would not be significant for upper layers (e.g., M8-M9 layers)), but as the spacing improves between the wires, the increase in capacitance would make such a design worthwhile. In certain cases, the barrier and liner thicknesses within these geometries may or may not vary.

As another solution, in a second implementation as shown in FIG. 19B, the widths (W) and the spacing(S) of the first and second wires 1910, 1920 may be substantially the same as that of similar wires at room temperature, while the thickness (T) would be decreased in comparison to that of similar wires at room temperature. Advantageously, while the reduction of the thickness (T) of the wires for low temperature optimized design would increase resistivity (however, at low temperatures this increase would not be significant for upper layers (e.g., M8-M9 layers)), but the increase in capacitance, as a result of the coupling distance, would make such a design worthwhile.

Moreover, in certain cases, both of the implementations can be utilized together to determine an optimal RC (resistance-capacitance) for wire interconnects utilized in an integrated circuit.

Referring to FIGS. 20A-20B, representations 2000, 2050 of example wiring geometry are shown, according to example inventive implementations. As illustrated, FIGS. 20A-20B depict cross-sectional wire geometry 2000, 2050 of two example wiring lengths (e.g., copper, aluminum, etc.) for operation at low temperature (e.g., below 200K) in integrated circuitry. In certain implementations, FIGS. 20A-20B illustrate inventive low-temperature (e.g., below 200K) wire-geometry for resistance-limited metal levels (e.g., M1-M3 layers) by offsetting capacitance improvement (C) to improve resistance (R).

Specifically, such solutions would apply for metal layers which are resistance-limited to take advantage of the resistance improvement at low temperatures (e.g., below 200K). In addition, as the spacing(S) between wires may be limited (i.e., limiting factor) by the reliability of the dielectric (e.g., narrower dielectrics are more prone to time dependent dielectric breakdown (TDDB). In certain examples, by reducing spacing(S) below a certain point, an electric field would generate between the circuit structures and correspondingly cause stress on the dielectric between the first and second wires 2010, 2020. Correspondingly, time-dependent-dielectric-breakdown (TDDB) refers to the occurrence beyond a certain point where the dielectric would break down.

Consequently, as TDDB is temperature sensitive, and is observed to break down much later at much lower temperatures (e.g., below 200K), TDDB would be one "reliability" property. Hence, in the inventive implementations, by utilizing TDDB as a temperature sensitive reliability property for low temperatures, adjustment to the spacing(S) can be made. Hence, in such a scenario, increases in the area of the wires can be used to improve resistance (R) (at the expense of capacitance (C)) (e.g., for M1-M3 metal levels, resistance may be problematic (because they are so "tiny", but capacitance is not much of a problem for PPA). Accordingly, as in FIG. 20A, increasing the width (W), so as to reduce spacing (S), as well as in FIG. 20B, increasing the thickness (T), may increase resistivity. Alternatively, in certain cases, a combination of the solutions in FIGS. 20A and 20B can be implemented to improve resistivity.

Accordingly, in certain inventive implementations, the spacing(S) and thickness (T) may be maintained for at least a minimum value to limit: capacitance (C); the corresponding electric field (F) between the first and second wires 2010, 2020, and avoid TDDB.

Advantageously, such optimizations (as described with respect to FIGS. 20A-20B) utilize and exploit electrical characteristics (e.g., resistance and capacitance) of an example wiring based on "reliability" characteristics of the material used. In certain implementations, such reliability characteristics may include TDDB, dielectric breakdown, and electromigration. For instance, for low temperature optimization, spacing can be reduced (FIG. 20A) and thickness can be increased beyond the limiting factor (e.g., the TDDB level between the first and second wirings 2010, 2020 that would be used at room temperature (e.g., between 288K-300K).

As one solution, in one implementation as shown in FIGS. 20A, for low temperature operation, the widths (W) of one or both of the first and second wires 2010, 2020 may be increased and correspondingly the spacing(S) between the first and second wires may be decreased in comparison to the widths and spacing of similar wires at room temperature, while the thickness (T) would be substantially the same as that of similar wires at room temperature. Advantageously, the reduction of the width (W) of the wires in low temperature optimized design effectively would reduce resistivity at the cost of wire capacitance. However, at low temperatures the reduction of resistivity would not be significant for lower layers (e.g., M1-M3 layers)).

As another solution, in a second implementation as shown in FIG. 20B, the widths (W) and the spacing(S) of the first and second wires 2010, 2020 may be substantially the same as that of similar wires at room temperature, while the thickness (T) would be increased in comparison to that of similar wires at room temperature. Advantageously, while the increase of the thickness (T) of the wires for low temperature optimized design would lower resistivity, at low temperatures this reduction would not be significant for lower layers (e.g., M1-M3 layers).

In certain implementations, comparable to interconnects, similar wire geometry schemes and techniques may also be performed for memory bitcells, bitlines (BL) and wordlines (WL).

Currently, in known techniques at room temperature (approximately 300K), BL and/or WL wire capacitance and resistance are increasing at advanced nodes. While certain known techniques (e.g., parallel WL, flying WL/BL) are used to improve WL resistance at advanced technology nodes, as a detriment, such known techniques would also increase BL and/or WL capacitance. In addition, the BL may also be limited by large loading capacitances. Accordingly, known resistance improvement techniques that compromise capacitance (e.g., decrease capacitance) are avoided. Also, at advanced nodes, the quantity of bitcells in a particular memory array would also be limited by long resistive BL wiring.

Accordingly, as solutions, in certain implementations for low temperature (e.g., below 200K) operation, utilization of aluminum metal as a material for BL and/or WL would overcome the known drawbacks and enhance bitcell performance. For example, as discussed in above paragraphs, aluminum metal can have up to four times lower resistivity in comparison to copper metals.

In addition, utilizing the inventive aspects, a greater number of bitcells can be included in memory arrays, each having longer bitlines (e.g., as each would have four times lower resistivity). Hence, improvements in the memory bitcells to input-output device ratio (i.e., memory/IO ratio) would also be realized.

Moreover, in other inventive implementations, similar to the example wiring geometry as described with reference to FIGS. 20A-B and 20A-B, the aspect ratio of aluminum BL and/or WL wiring may also be altered to improve BL/WL capacitance. Accordingly, such aluminum BL and/or WL wiring would also take advantage of the four times lower resistance (in comparison to copper wiring) at lower temperatures (e.g., below 200K).

In certain cases, inventive optimization may be performed at the circuit design level. In inventive modeling and experimentation (e.g., at for 5 nm nodes), it can be demonstrated that that at reduced temperatures, PMOS devices show a greater temperature sensitivity in comparison to NMOS devices. This can be attributed to the device parameters in PMOS and NMOS having unique temperature sensitivities depending on the process. For instance, their relative behavior can be different at room-temperature (e.g., 300K) versus super- or cryo-cooled temperatures (e.g., below 200K).

Figure 21:
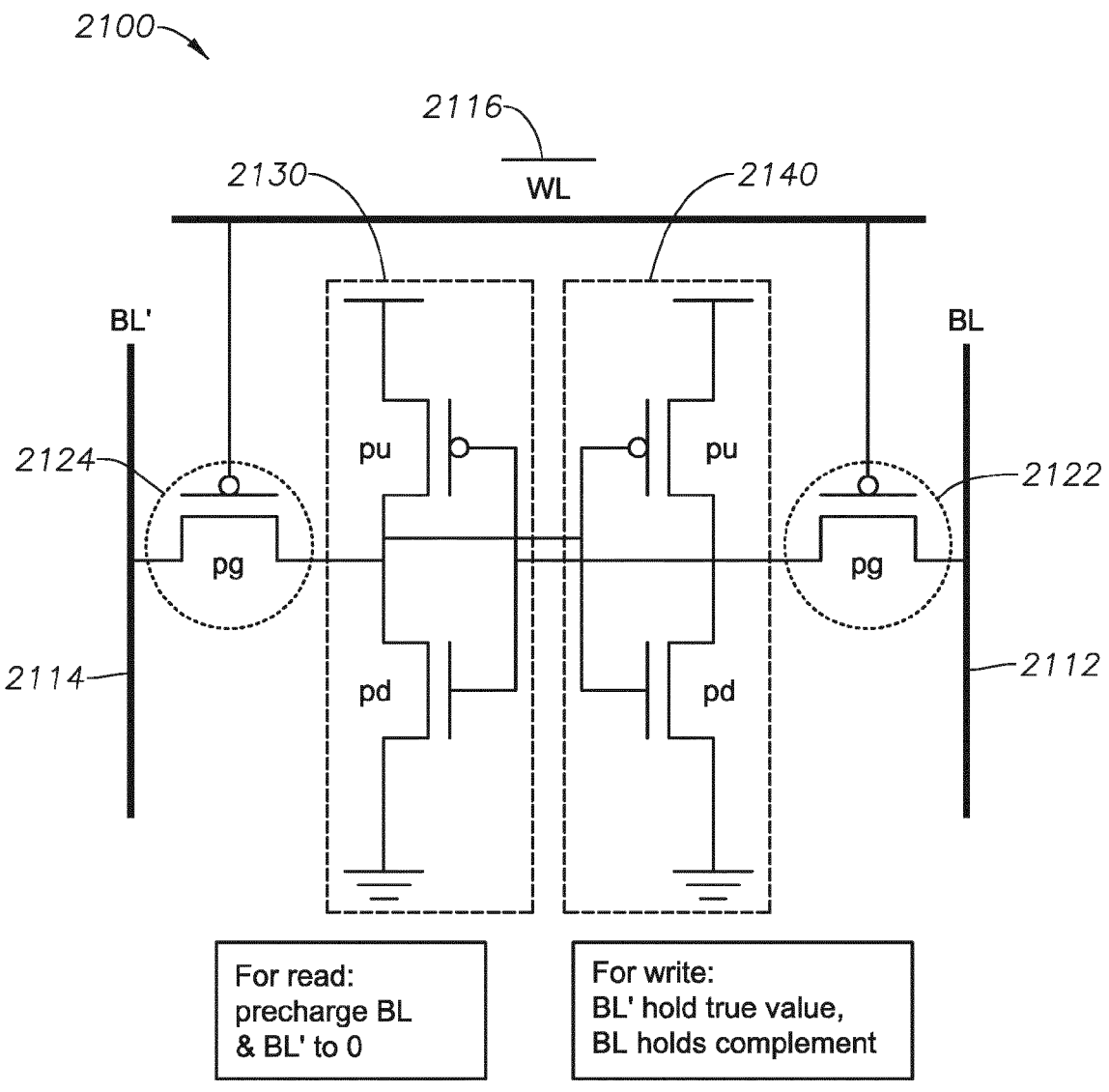
FIG. 21 is a circuit diagram in accordance with various implementations described herein.

Referring to FIG. 21, an example circuit for a bitcell 2100 is shown. As depicted in FIG. 21, the example circuit design comprises six-transistor bitcell 2100 (i.e., 6T SRAM bit-cell 2100) including: at least first and second access transistors (pg) 2122, 2114 (i.e., pass-gate transistors); first and second inverters (2130, 2140) (e.g., dynamic storage elements); first and second bitlines (e.g., BL (bitline) and BL' (complementary bitline)) 2112, 2114; at least one word-line (WL,) (e.g., top line) 2116. In some implementations, the first and second bitlines 2112, 2114 are coupled to the respective first and second access transistors 2122, 2114. Also, in certain cases, the bitcell 2100 assumes RC loading on the word line or bitlines and ideal drivers. Moreover, the circuit 2100 is an example of pre-charge circuitry or pre-discharge circuitry. In other implementations (not shown), the example circuit design may include an SRAM 8-transistor bitcell or other RAM variants, including DRAM/MRAM and variants.

In certain implementations, each of the first and second inverters 2130, 2140 may include a pull-up transistor (pu) (i.e., a pull-up device) (e.g., a PMOS transistor, a PMOS device) and a pull-down transistor (pd) (i.e., pull-down device) (e.g., an NMOS transistor, an NMOS device). In an example operation, the two inverters 2130, 2140 may feedback to one or the other storing data values of a digital "1" or "0". The stored data value may be accessed by either the first or the second bitlines 2112, 2114.

Moreover, in certain implementations, the metals utilizing for the bitlines and/or wordlines may also be switched based on the schemes and techniques as described herein (e.g., switching from copper wiring to aluminum wiring). In doing so, advantageously, the example design 2100 may further benefit from the temperature sensitivity realized at low temperatures (e.g., below 200K).

In traditional use cases, the pass-gate devices would be NMOS devices, because NMOS devices provided better performance. However, in contrast, according to inventive aspects for low temperature operation (e.g., below 200K), the polarity of the entire bitcell is now "flipped" (i.e., reversed, opposite). Hence, in one example implementation: BL would now be a BL'; BL' would be a BL; WL would be WL; PMOS pass-gate transistors would replace NMOS pass-gate transistors; the sizing of pull up and pull down is reversed such that where traditionally the pull down NMOS is stronger compared to the pass gate NMOS (for read stability) and pull up PMOS is weaker than the pass gate NMOS for writability, this invention may result in a pull-down NMOS being weaker than pass gate PMOS (for writability) and pullup PMOS being stronger than pass gate PMOS for read stability. By doing so, inventive aspects take advantage of the "strong" PMOS for pull-up devices and pass-gate devices, and realize performance gains that are temperature specific.

Moreover, for read operations, in contrast to known methodologies, in some instances, the BL would be pre-charged pre-discharged (i.e., set to data "0" value, instead of a "1" data value) and BL' (e.g., set to a data "0" value, instead of a "1" value). Also, for write operations, in certain instances, BL' would hold the "true" value and BL would hold its complement (e.g., in contrast known methodologies).

Advantageously, in certain cases, the circuit of FIG. 21 is specifically optimized for low temperature (e.g., below 200K) operation, for which known classical bitcells may not operate. In implementations, two types of SRAM bitcells that may be utilized include: high density (HD) or high current (HC).

In certain instances, temperature may be utilized to control beta ratio (i.e., the average delay metric of the quotient of the pull up device and the pull down device (i.e., PMOS/NMOS)). The beta ration may be utilized at the input variable (i.e., metric) to determine a particular circuit diagram and threshold voltage (VT) of pass-gate, pull-up, and pass-down transistors. In doing so, the sizing of the transistors may also be optimized. For instance, as two times stronger PMOS at low temperature (e.g., below 200K) would allow the use of a "flipped" high density (HD) memory instead of a "flipped" high current (HC) memory without having to upsize the respective gates (and thus, save area). In some cases, the inventive aspects would similarly apply to NMOS devices. For instance, if the NMOS would be 2× stronger at lower temperatures (i.e., below 200K), HD memory can replace HC memory without upsizing gates (and therefore, saving area and power with corresponding performance).

Figure 22:
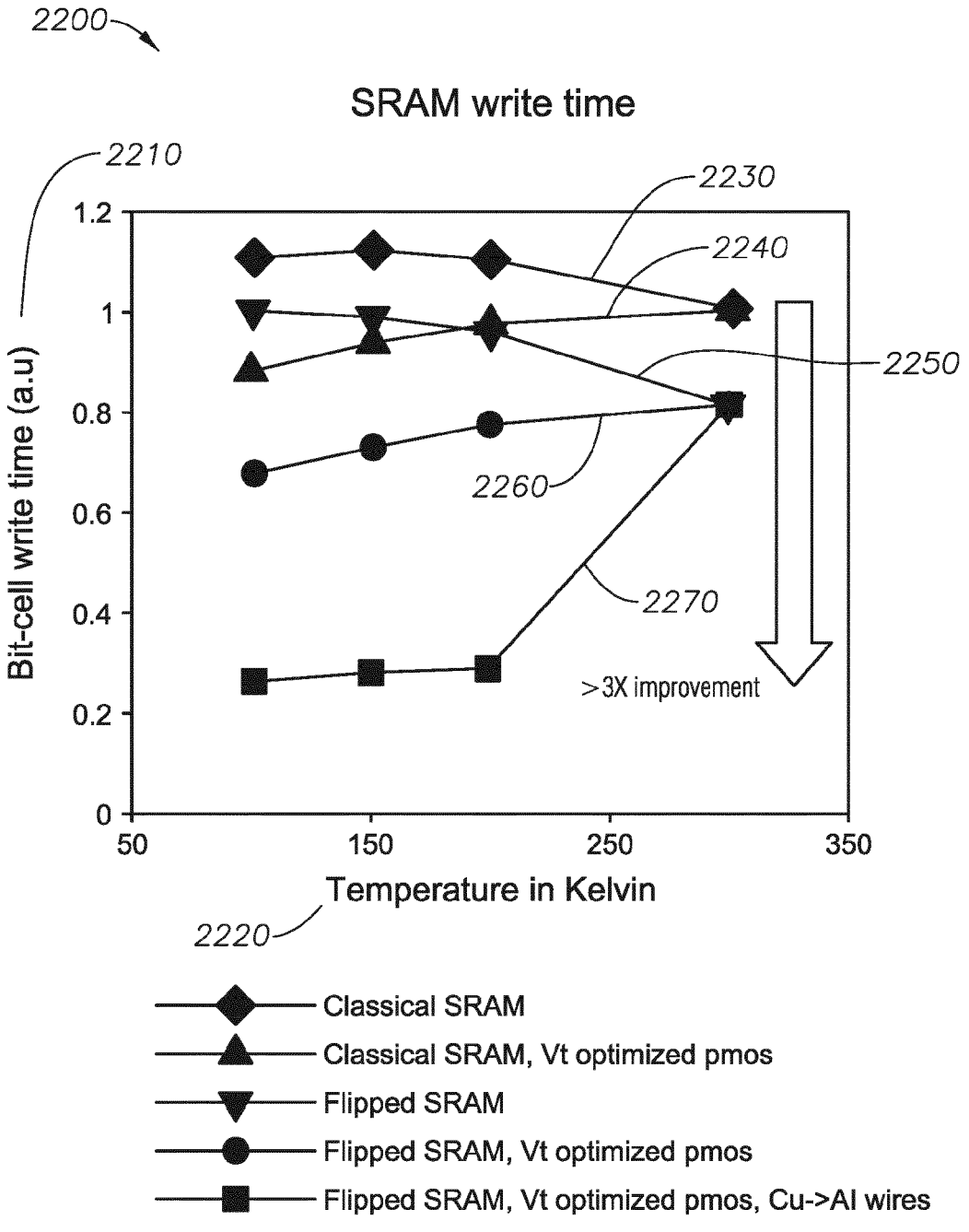
FIGS. 22-23 are graphs in accordance with various implementations described herein.

Referring to FIG. 22, a graph 2200 according to an example implementation of a HD bitcell (e.g., 111 HD bitcell) is shown. As illustrated, FIG. 22 depicts a graph of SRAM write time demonstrating the advantages of various inventive optimizations as described herein. The graph 2200 provides bitcell write time (a.u) from 0 to 1.2 on the Y-axis 2210 and temperature (K) from 0K to 350K on the X-axis 2220. As depicted, on the graph 2200: curve 2230 represents the write time of a classical SRAM optimized for room temperature (e.g., approximately 300K); curve 2240 represents write time of the classical SRAM with PMOS threshold voltage optimized (according the inventive aspects as described herein); curve 2250 represents write time of the "flipped" inventive SRAM (according the inventive aspects as described with reference to FIG. 21); curve 2260 represents write time of the "flipped" inventive SRAM (according the inventive aspects as described with reference to FIG. 21) and PMOS threshold voltage optimized (according the inventive aspects as described herein); and curve 2270 represents write time of the "flipped" inventive SRAM (according the inventive aspects as described with reference to FIG. 21), PMOS threshold voltage optimized (according the inventive aspects as described herein), and copper wiring replaced with aluminum wiring for, e.g., BEOL connectivity (to optimize for low temperature (e.g., below 200K) according the inventive aspects as described herein). Advantageously, as would be appreciated, significant improvement for write time may be realized at low temperature operation with the inventive schemes and techniques as described herein.

Advantageously, as shown, for a classical SRAM (with pull-up (pu), pass-gate (pg) and pull-down (pd) HD sizing: 1-1-1), as the temperature lowers from 300K to 100, the write time gets worse. In implementations where VT is optimized, the mobility increases, and write time may be reduced by ~20%. Also, in the "flipped" polarity implementation, a ~40% reduction in write time is realized. Furthermore, in the flipped polarity with aluminum wiring, a ~3× improvement in write time may be realized at low temperatures (e.g., below 200K).

Figure 23:
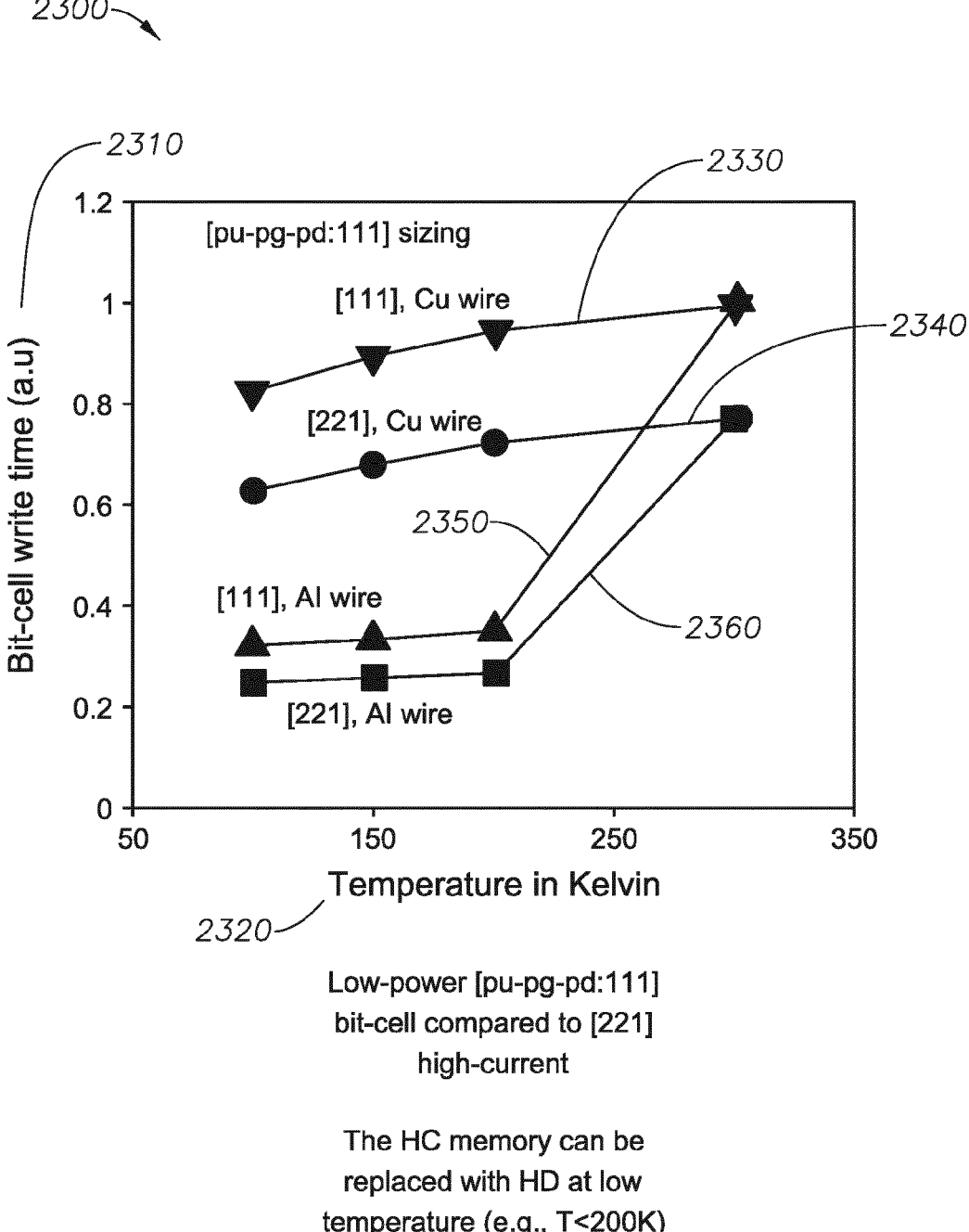

Referring to FIG. 23, a graph 2300 according to an example implementation is shown. As illustrated, FIG. 23 depicts a comparison of bit-cell write time (a.u) of a low power (e.g., where the sizing of the pull-up (pu), pass-gate (pg) and pull-down (pd) transistors: 1-1-1) bitcell and a high current (e.g., the sizing of the pu-pg-pd transistors: 2-2-1) bitcell as described herein. The graph 2300 provides bitcell write time (a.u) from 0 to 1.2 on the Y-axis 2310 and temperature (K) from 0K to 350K on the X-axis 2320. As depicted, on the graph 2300: curves 2330 and 2350 (i.e., with triangle denotation) illustrate low power bitcells utilizing cupper (curve 2330) and aluminum (2350), respectively; and curves 2340 and 2360 (i.e., with diamond denotation) illustrate high current bitcells.

Advantageously, as would be appreciated, by the high current (HC) memory bitcells can be replaced with high density (HD) bitcells below a temperature threshold (e.g., temperature below 200K).

Figure 24A:
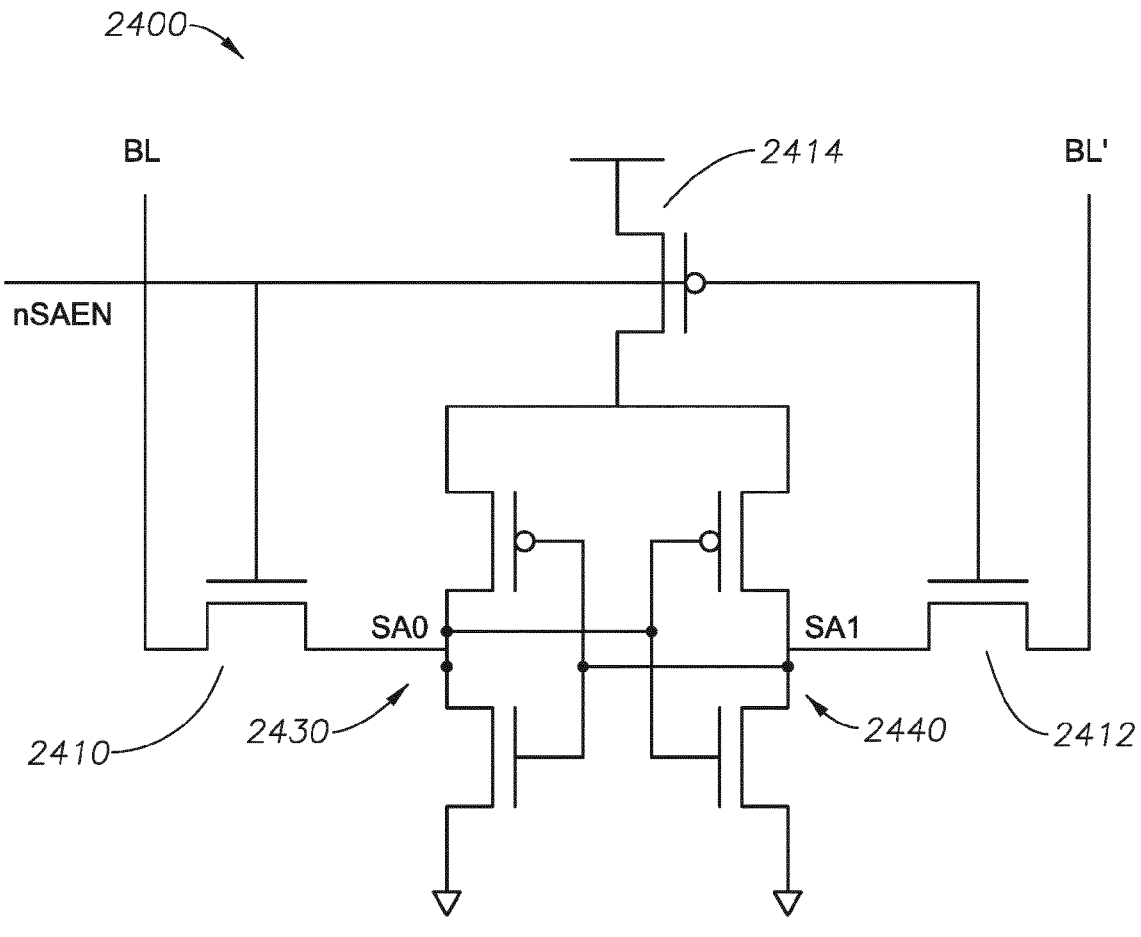
FIGS. 24A-24B are circuit diagrams in accordance with various implementations described herein.

Referring to FIG. 24A, an example circuit 2400 according to example implementations is shown. As depicted in FIG. 24A, the example circuit design comprises a latch sense amplifier circuitry with explicit pass gates. The circuit design 2400 includes first and second inverters 2430, 2440 (each including a NMOS device and a PMOS device) coupled to first and second pass gates 2410 and 2412 (i.e., first and second transistor devices) and a third transistor 2414. In certain implementations, the first and second transistor devices 2410, 2412 of the of the sense amplifier circuitry are NMOS devices, and wherein the third transistor device 2414 of the sense amplifier circuitry is an PMOS device.

Also, in such implementations, the polarity may be "flipped" for first and second bitlines (BL, BL') coupled to the circuit 2400. Moreover, as shown, the polarity of a sense enable line may be "flipped" to a sense enable complement line (i.e., nSAEN). As illustrated the sense enable complement line would be coupled to a gate of the PMOS transistor devices 2414. In sense amplifier operation, advantageously, the NMOS devices of the first and second inverters 2430 may be utilized as a pull-down device for "strong" 1's instead of "strong" 0's.

Figure 24B:
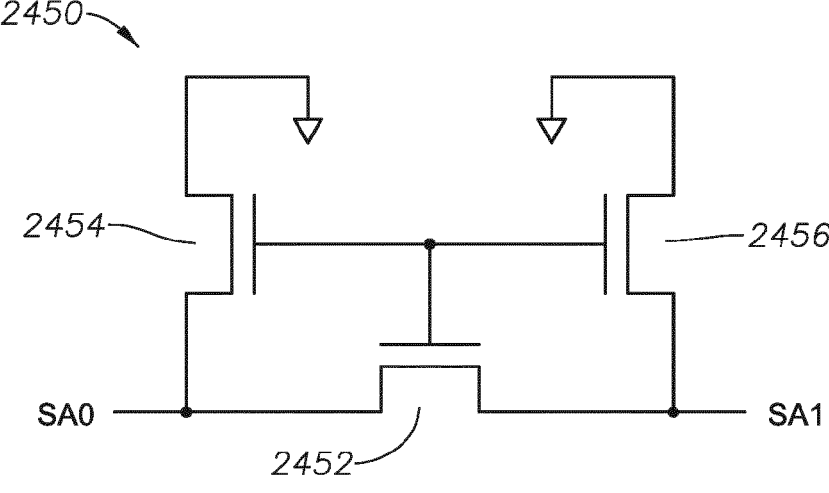

Referring to FIG. 24B, an example circuit 2450 according to example implementations is shown. As depicted in FIG. 24B, the example circuit design comprises pre-charge circuitry 2450. The circuit design 2450 includes first, second, and third transistor devices 2452, 2454, and 2456. In certain implementations, the first, second, and third transistor devices 2452, 2454, and 2456 are NMOS devices. Furthermore, the pre-charge circuitry 2450 may include the NMOS device 2452 that allows for the SA0 and SA1 to be pre-charged (pre-discharged) to a "clean" 0, whereas the input may be complemented. In certain implementations, the example circuit 2450 may be coupled to the example circuit 2400.

Figure 25A:
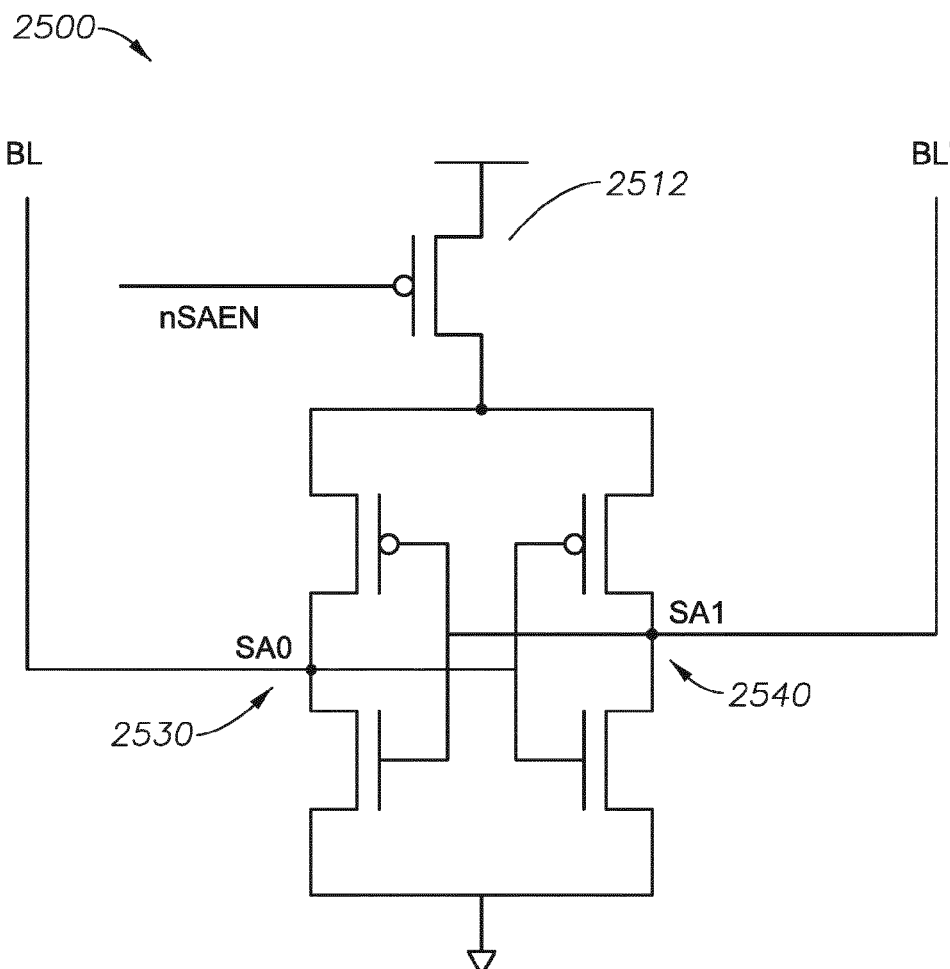
FIGS. 25A-25B are circuit diagrams in accordance with various implementations described herein.

Referring to FIG. 25A, an example circuit 2500 according to example implementations is shown. As depicted in FIG. 25A, the example circuit design comprises a latch sense amplifier circuitry without explicit pass gates. The circuit design 2500 includes first and second inverters 2530, 2540 (each including a NMOS device and a PMOS device) coupled to a transistor device 2512. In certain implementations, the transistor device 2512 of the sense amplifier circuitry is an PMOS device.

Also, in such implementations, the polarity may be "flipped" for first and second bitlines (BL, BL') coupled to the circuit 2500. Moreover, as shown, the polarity of a sense enable line may be "flipped" to a sense enable complement line (i.e., nSAEN). As illustrated the sense enable complement line would be coupled to a gate of the PMOS transistor devices 2514. In sense amplifier operation, advantageously, the NMOS devices (of the first and second inverters 2430) may be utilized as a pull-down device for "strong" 1's instead of "strong" 0's.

Figure 25B:
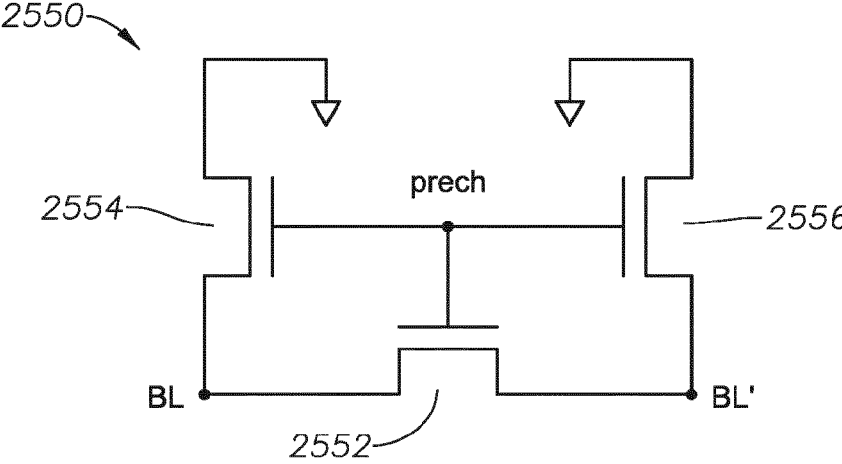

Referring to FIG. 25B, an example circuit 2550 according to example implementations is shown. As depicted in FIG. 25B, the example circuit design comprises pre-charge circuitry 2550. The circuit design 2550 includes first, second, and third transistor devices 2552, 2554, and 2556. In certain implementations, the first, second, and third transistor devices 2452, 2454, and 2456 are NMOS devices. Furthermore, the pre-charge circuitry 2550 may include the NMOS device 2552 that allows for the BL and BL' to be pre-charged to a "clean" 0, whereas the input may be complemented. In certain implementations, the example circuit 2450 may be coupled to the example circuit 2400.

Figure 26A:
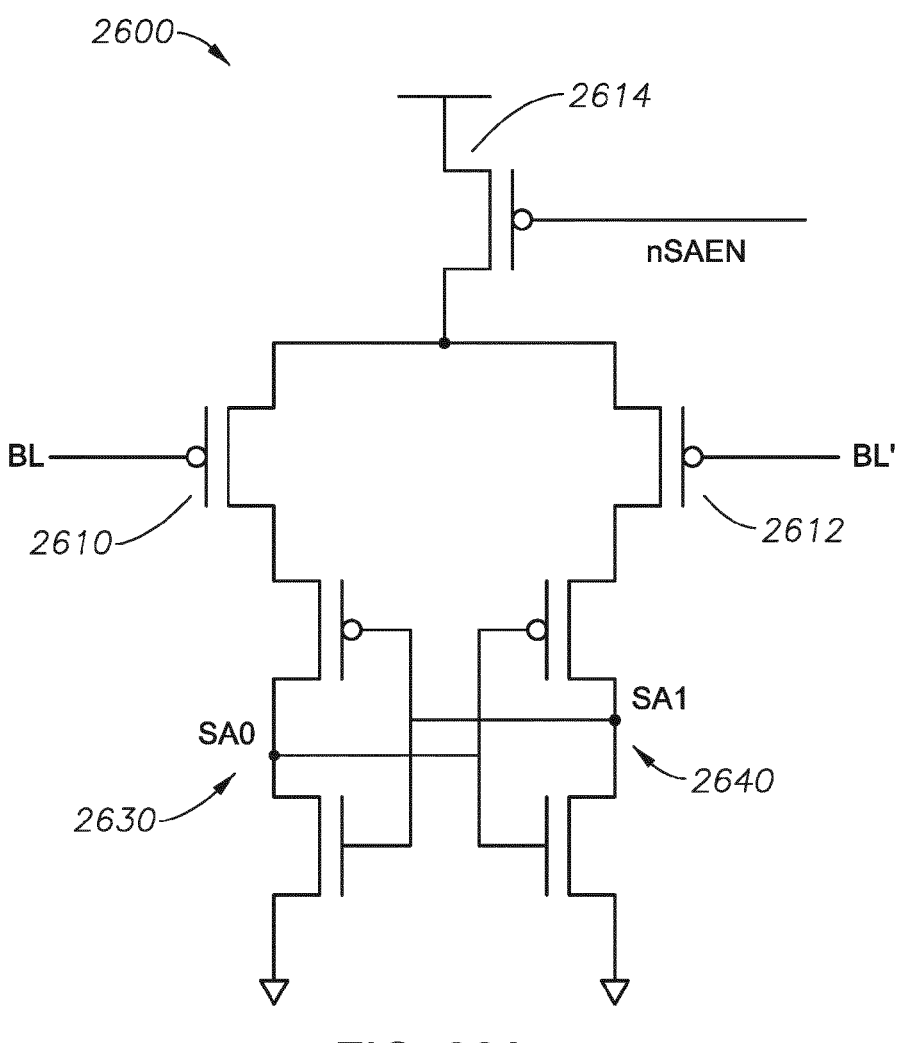
FIGS. 26A-26B are circuit diagrams in accordance with various implementations described herein.

Referring to FIG. 26A, an example circuit 2600 according to example implementations is shown. As depicted in FIG. 26A, the example circuit design comprises a latch sense amplifier circuitry. The circuit design 2600 includes first and second inverters 2630, 2640 (each including a NMOS device and a PMOS device) coupled to first, second, and third transistor devices 2610, 2612, and 2614. In certain implementations, the f first, second, and third transistor devices 2610, 2612, and 2614 of the of the sense amplifier circuitry are PMOS devices.

Also, in such implementations, the polarity may be "flipped" for first and second bitlines (BL, BL') coupled to the circuit 2500. Moreover, as shown, the polarity of a sense enable line may be "flipped" to a sense enable complement line (i.e., nSAEN). As illustrated the sense enable complement line (nSAEN) would be coupled to a gate of the PMOS transistor devices 2614. In sense amplifier operation, advantageously, the NMOS devices of the first and second inverters 2430 may be utilized as a pull-down device for "strong" 1's instead of "strong" 0's.

Figure 26B:
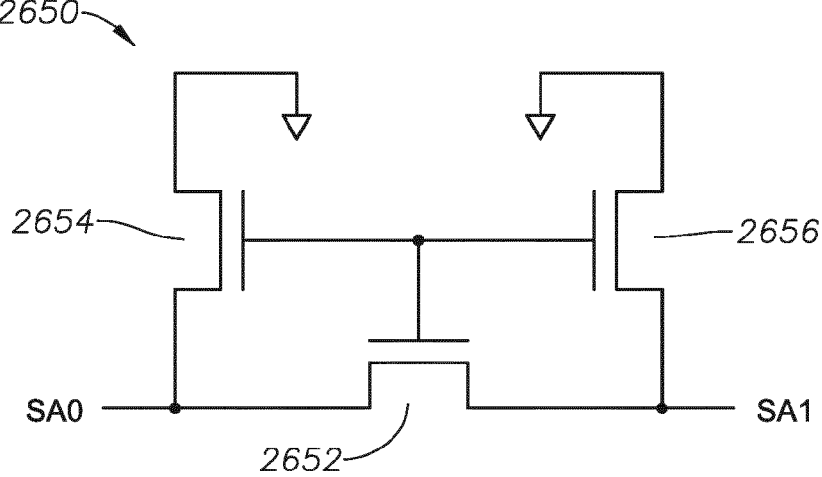

Referring to FIG. 26B, an example circuit 2650 according to example implementations is shown. As depicted in FIG. 26B, the example circuit design comprises pre-charge circuitry 2650. The circuit design 2650 includes first, second, and third transistor devices 2652, 2654, and 2656. In certain implementations, the first, second, and third transistor devices 2652, 2654, and 2656 are NMOS devices. Furthermore, the pre-charge circuitry 2650 may include the NMOS device 2652 that allows for the SA0 and SA1 to be pre-charged to a "clean" 0, whereas the input may be complemented. In certain implementations, the example circuit 2650 may be coupled to the example circuit 2600.

In certain cases, according to the inventive aspects, electronic design automation (EDA) may also be optimized at lower temperatures (i.e., below 200K). In examples, while an optimal temperature for each particular process node and each design type may be different, low temperature CMOS can add further metrics to the optimization space. Hence, inventive EDA can introduce additional variables (i.e., metrics) for operational methodologies to EDA software to optimize for low temperature PPA taking into account a translation of power dissipation, a cost of cooling to enable designs at low temperatures (i.e., below 200K) in addition to tuning knobs like threshold voltage and supply voltage VDD.

Figure 27:
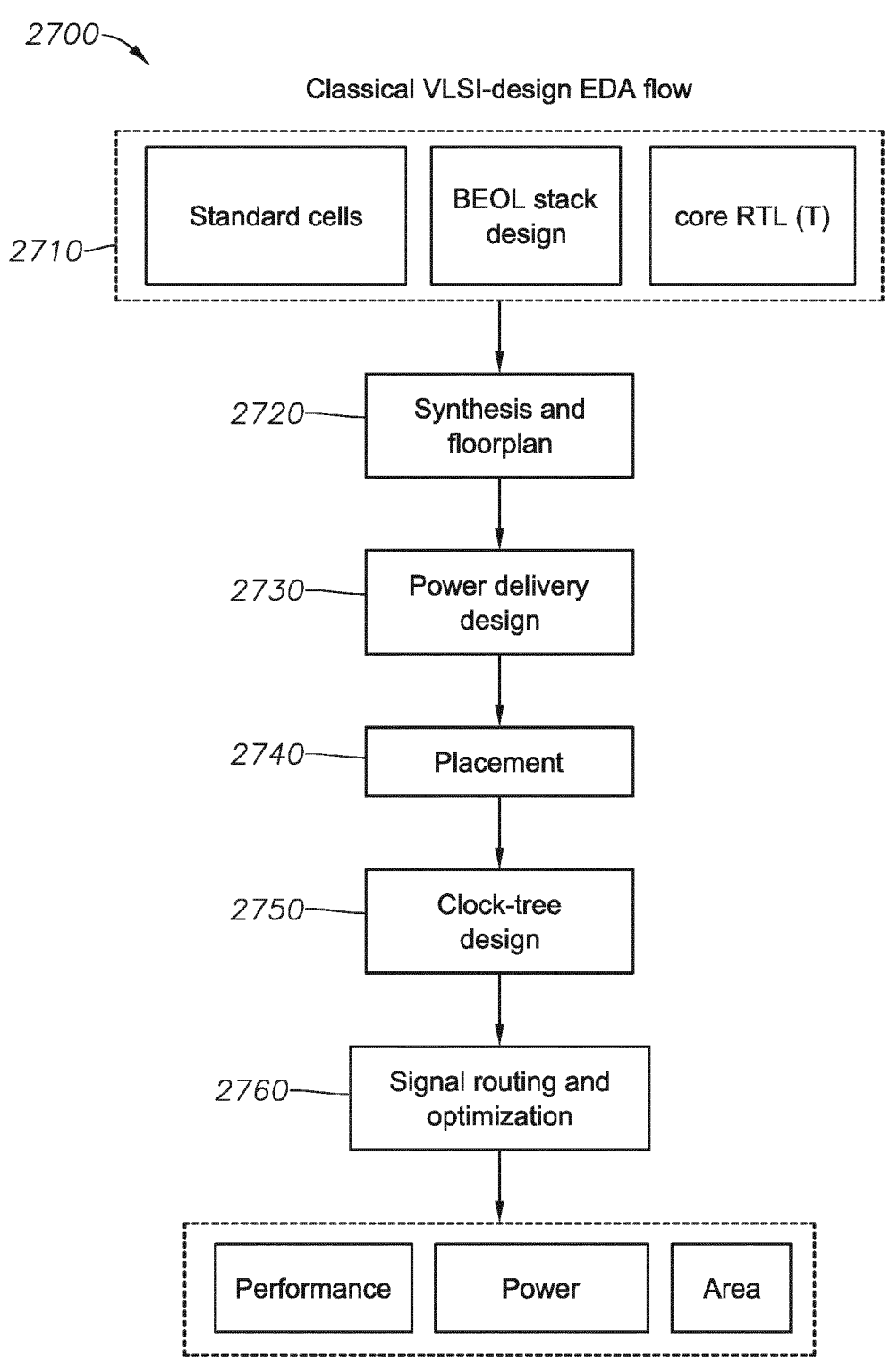
FIG. 27 is a flow chart in accordance with various implementations described herein.

Referring to FIG. 27, a flowchart of a classical VLSI-design EDA flow 2700 is shown. Initially, at step 2710, a designer would designate one or more of standard cells of a cell library, memory macros, a BEOL stack, and a core register-transfer-level (RTL) for use. Next, at consecutive steps, the design automation would proceed to through the following steps: synthesis and floorplan (step 2720); power delivery design (step 2730); placement (step 2740); clock-tree design (step 2750); and signal routing and optimization and timing closure (step 2760). The process results in an EDA flow that is optimized for performance, power, and area.

According to inventive aspects, the VLSI-design EDA flow may be improved to allow for and optimize for VLSI-design EDA flow at low temperatures (e.g., below 200K), where one or more optimization parameters may be specified to the EDA tool 4024 (as described with reference to FIG. 40).

Figure 28:
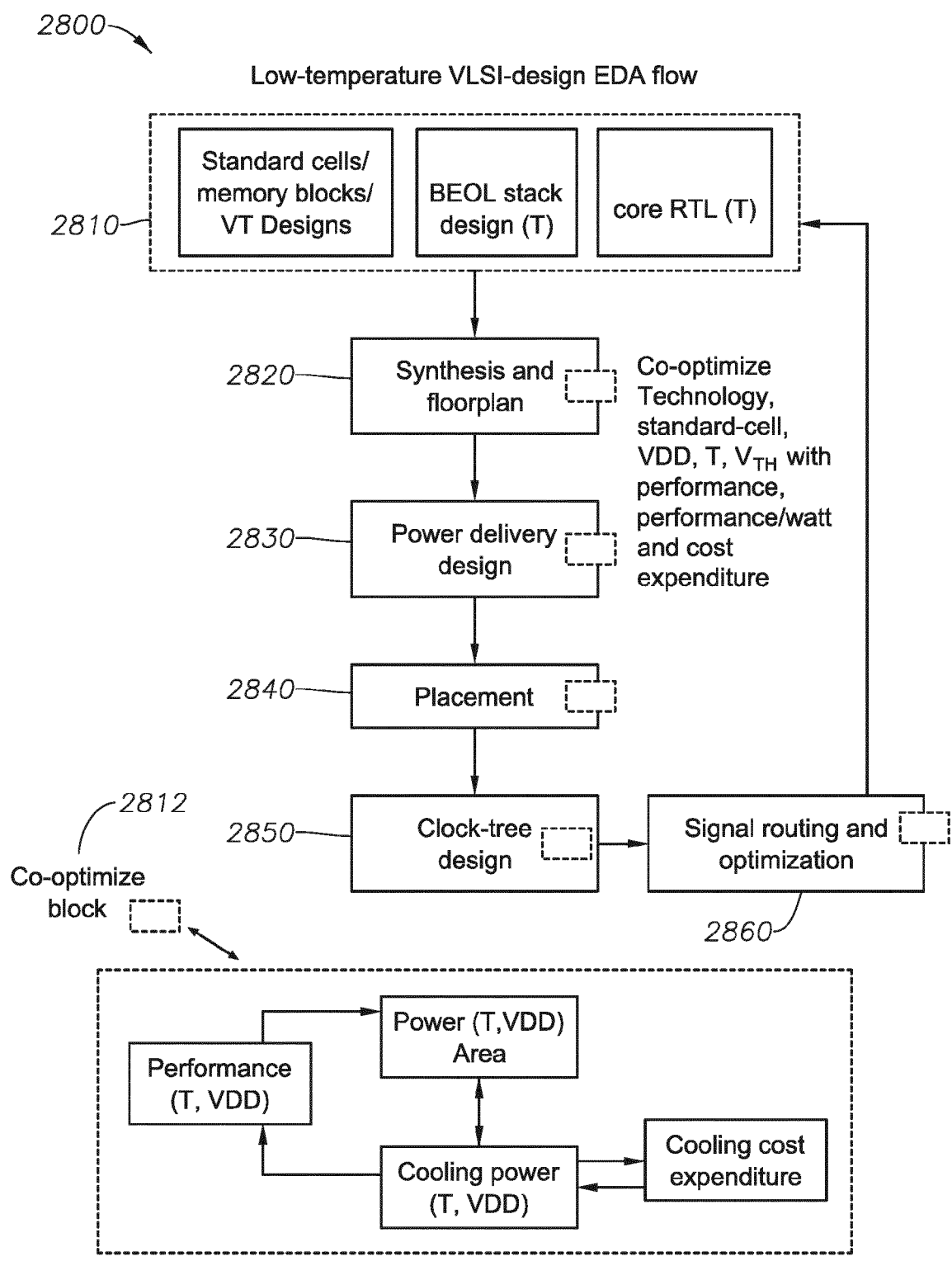
FIG. 28 is a flow chart illustrating certain aspects of various implementations described herein.

Referring to FIG. 28, a flowchart of a VLSI-design EDA flow 2800 (operational method 2800) according to example implementations is shown. The operational method 2800 may be implemented by an EDA tool 4024 for low temperature VLSI-design EDA flow (as described with reference to FIG. 40). Initially, at step 2810, one or more standard logic-cells (with designated VT flavors), memory blocks (i.e., memory macros units), and/or VT designs (including multi-VTs) from libraries may be selected based on parameters including the operating temperature (T) (e.g., a temperature below a temperature threshold (e.g., 200K)), the operating supply voltage ($V_{DD}$), and threshold voltage(s) ($V_{TH}$); a BEOL stack design may be selected based on the parameter operating temperature (T); and a core RTL (e.g., prioritize NOR over NAND logic) may also be selected based on the parameter operating temperature that accounts for optimizations made to take advantage of temperature sensitivity.

Advantageously, in certain implementations, the EDA tool 4024 allows for the capability (i.e., option) to specify and select from the above-mentioned one or more parameters. For instance, a designer may indicate to the EDA tool 4024 to select from different standard cells (and/or memory blocks) that are optimized for different temperatures (e.g., below 200K) and different supply voltage, where the sizing may be predefined based on a low temperature (e.g., below 200K) specification.

Subsequently, after the selection of the one or more parameters, at each of the following steps: synthesis and floorplan (step 2820); power delivery design (step 2830); placement (step 2840); clock-tree design (step 2850); and signal routing and optimization (step 2860), a co-optimization block 2812 (e.g., including a co-optimization routine) can be added to the EDA tool 4024 in the EDA flow.

In certain implementations, the co-optimization block 2812 provides the capability to co-optimize the standard cells (or memory blocks), BEOL stack design, and core RTL by incorporating the parameters $V_{DD}$, T, and $V_{TH}$ to account for (e.g., optimizes for) power, performance, and area as well as cooling power (as a function of temperature and operating voltage) and cooling expenditure (as described in previous paragraphs herein).

Advantageously, the inventive aspects provide the EDA tool 4024 the further capacity to allow for the selection of cooling power to optimize for design specifically for low temperature operation, in addition to the capability to choose between different designs that were predetermined for different temperature points. Accordingly, for example, to increase performance at low temperature (e.g., below 200K), the size of the cells may be increased, which would drive more current, so the circuit device would run faster. However, doing so, may not be advantageous to cooling power/cooling cost aspect and consideration.

In another example, when taking the cooling expenditure into account, the lowest VT would be optimal for highest performance. Hence, the EDA tool 4024 would have the option to select for multi-VT library (to optimize for power, add cells with higher VT for non-critical paths). In another case, if a designer does not require to take cooling power into account, there would be a multiplier to the power aspect (e.g., including parameters T, $V_{DD}$). (As may be appreciated, cooling power needs to be accounted for which is a multiple of total system power. In contrast, room temperature designs (e.g., approximately 288K-300K) this would not be a consideration.) Hence, different considerations, would require the weighting of certain parameters differently. Moreover, in one other example, due to heating based on the quantity of devices, workload and thermal properties of materials in the design which is temperature-dependent, additional balancing may be required such that maximum thermal threshold is met for the floor plan as a result of the cooling.

Hence, in various implementations, schemes and techniques as described herein are specifically designed for dedicated low temperature design (i.e., super-cooled and cryo-cooled temperature operation). For example, such schemes and techniques would not even operate at room temperature.

Figure 29:
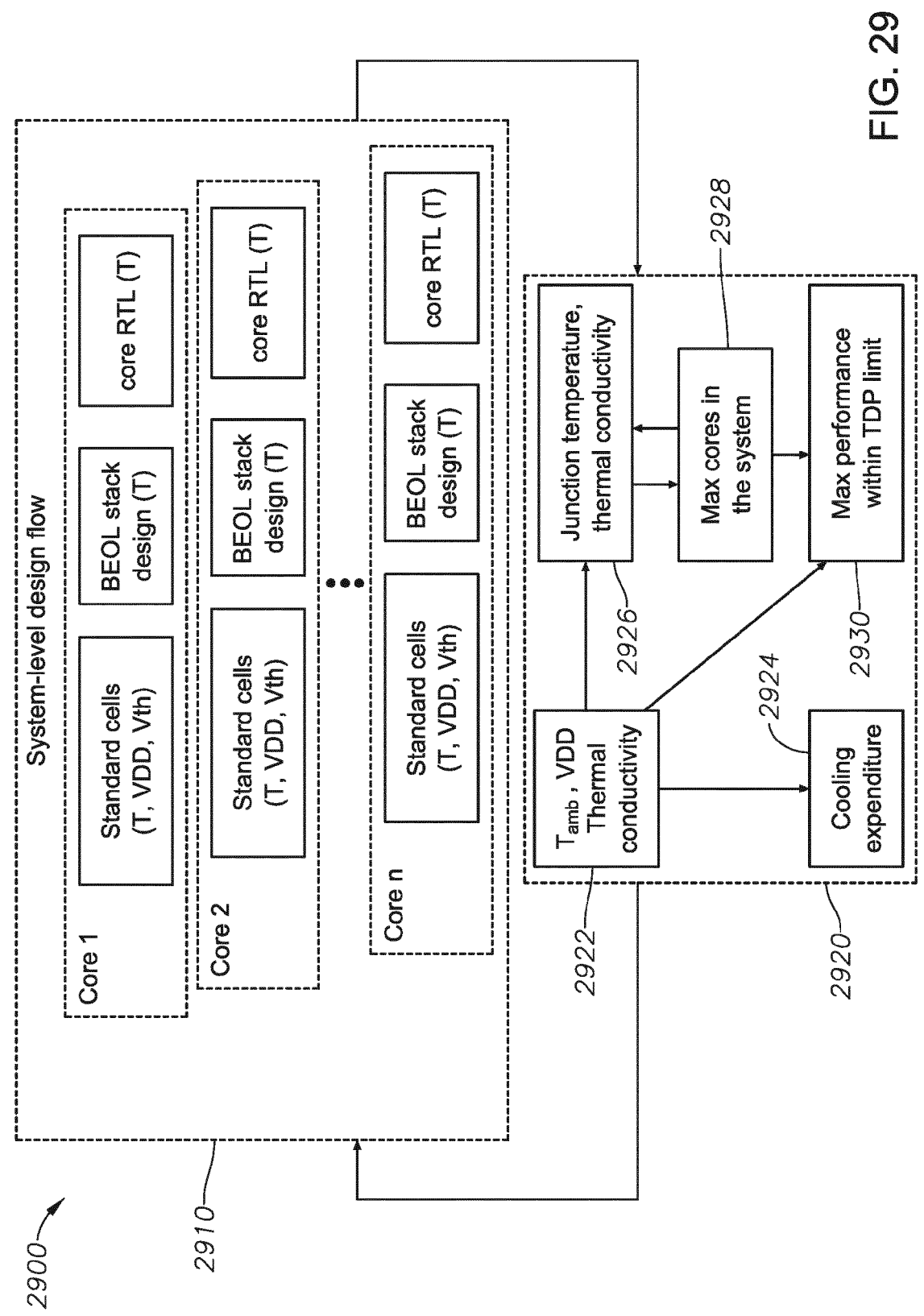
FIGS. 29-30 are block diagrams illustrating certain aspects of various implementations described herein.

Referring to FIG. 29, a flow diagram 2900 (operational method 2900) according to example implementations is shown. FIG. 29 illustrates example system-level power performance area and cost (PPAC) optimization methods, techniques and schemes.

Advantageously, the EDA tool 4024 may be extended to system-level design flow 2900 performance to co-optimize low temperature design (e.g., below 200K) PPA including: the power to cool as well as self-heating/thermal effects, and further taking into account frequency throttling.

In certain implementations, the example low temperature VLSI-design EDA flow 2800 (with reference to FIG. 28) may be considered one core (e.g., Core 1) of one or more cores (e.g., a plurality of cores) in the system-level design flow. Hence, similar to as described with reference to FIG. 26, the one or more parameters: temperature (T), operating voltage ($V_{DD}$), and threshold voltage ($V_{TH}$) may be used in decision-making to determine each optimal core (e.g., based on a priority factor of each parameter) of the system level design flow 2910.

Moreover, at the system-level, a system-level co-optimization block 2920 may be introduced to take into account other criteria (metrics) including: thermal conductivity 2922 (including parameters: ambient temperature (Tamb) and operating voltage ($V_{DD}$) and threshold voltage associated with logic and memory cells); cooling expenditure 2924 (e.g., of the circuitry as described in previous paragraphs); junction temperature and thermal conductivity 2926, maximum cores in the system 2928, and maximum performance within the cooling capacity (TDP) limit 2930). Advantageously, in certain implementations, the system maximum frequency and the number of active cores can be determined based on these metrics (as described in this paragraph).

Figure 30:
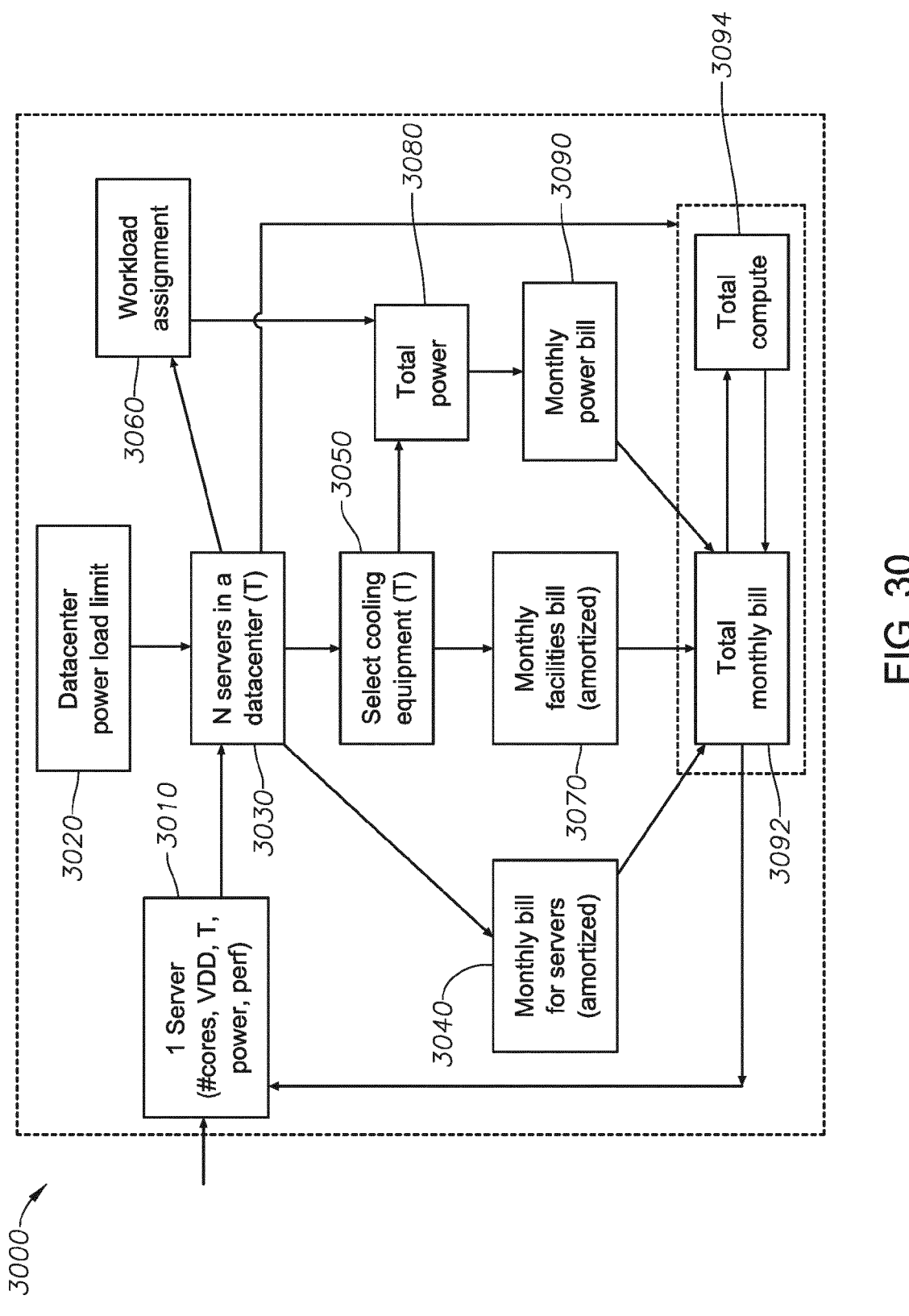

Referring to FIG. 30, a flow diagram 3000 (operational method 3000) according to example implementations is shown. FIG. 30 illustrates example data center-level power performance area and cost (PPAC) optimization techniques and schemes. Advantageously, the EDA tool 4024 may be extended to datacenter-level (and rack level) optimizations to co-optimize low temperature design (e.g., below 200K) PPA.

In certain implementations, the example low temperature system-level design flow 2900 (with reference to FIG. 29) may be considered one server 3010 (including parameters such as: a number of cores, $V_{DD}$, T, power metric, and performance metric) of one or more servers (e.g., a plurality of servers) of the datacenter system-level design flow. Hence, similar to as described with reference to FIG. 26, the one or more parameters: temperature (T) and operating voltage ($V_{DD}$), may be used in decision-making to determine each optimal server (e.g., based on a priority factor of each parameter) of the datacenter-level design flow 3000.

The datacenter-lever design flow also includes: a datacenter power load limit 3020, "N" servers in a datacenter 3030 (including the temperature parameter), a monthly bill for servers 3040 (amortized); select cooling equipment 3050 (including the temperature parameter); workload assignment 3060; monthly facilities bills 3070 (amortized); total power 3080; monthly power bill 3090; total monthly bill 3092; and total compute 3094.

Moreover, at the system-level, a system-level co-optimization block 2920 may be introduced to take into account other criteria (metrics) including: thermal conductivity 2922 (including parameters: ambient temperature (Tamb) and operating voltage ($V_{DD}$) and threshold voltage associated with the selected logic and memory cells); cooling expenditure 2924 (e.g., of the circuitry as described in previous paragraphs); junction temperature/thermal conductivity 2926, maximum cores in the system 2928, and maximum performance within the cooling capacity (TDP) limit 2930).

Advantageously, as described herein, FIGS. 28-30 illustrate methodologies according to inventive methodologies to optimize for EDA flow, system-level flow, datacenter-level flow, respectively.

Figure 31:
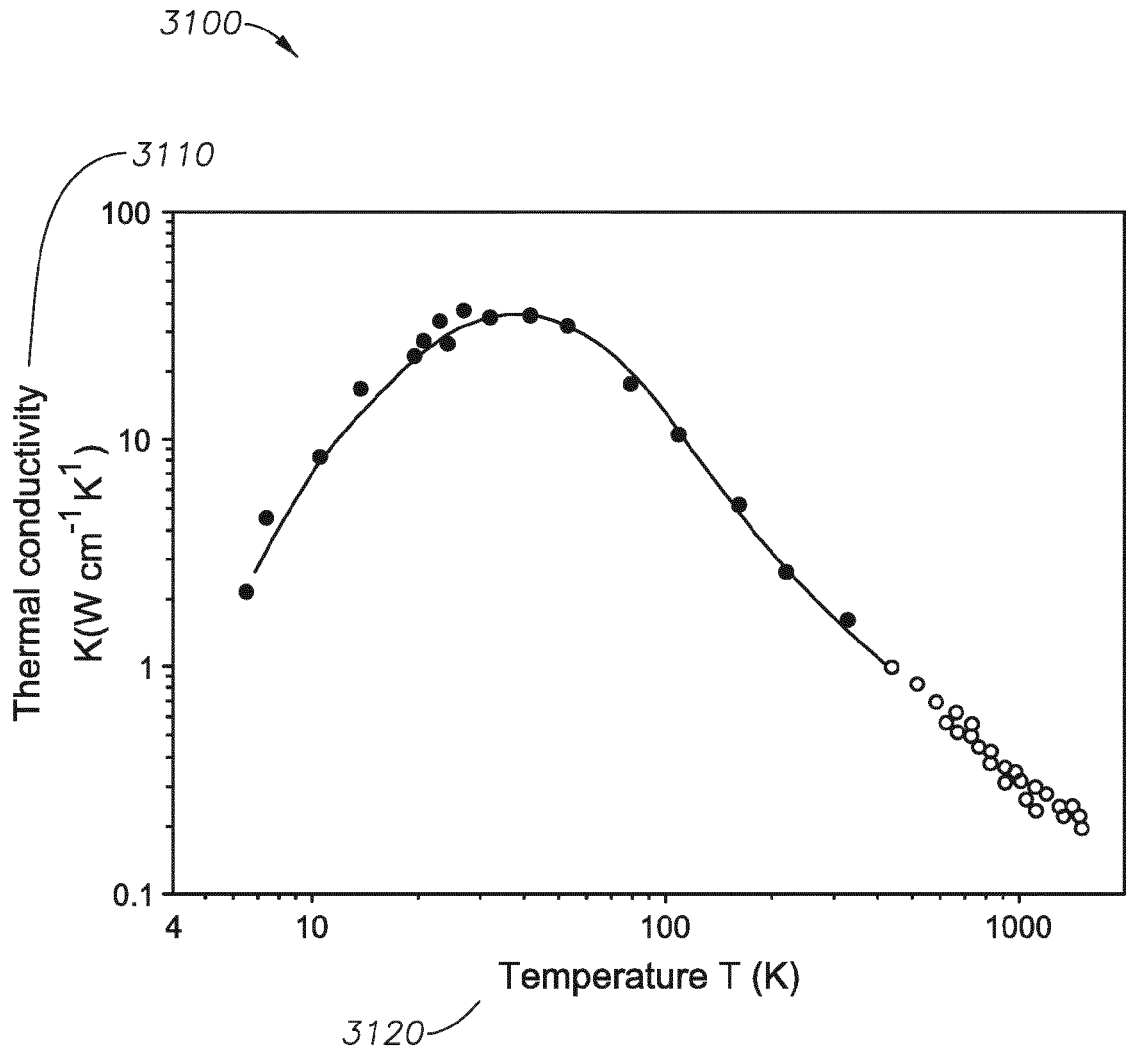
FIG. 31 is a graph in accordance with various implementations described herein.

Referring to FIG. 31, a graph 3100 is shown. As illustrated, FIG. 31 depicts a comparison of thermal conductivity K (W $cm^{-1}K^1$) 3110 (on the y-axis from 0 to 100) and temperature 3120 K (on the x-axis). As may readily appreciated, low temperature can improve the thermal conductivity of silicon bulk. Accordingly, self-heating of a semiconductor chip may be largely alleviated. As illustrated, thermal conductivity may improve by one order of magnitude at 100K in comparison to room temperature (e.g., 300K). Hence, this result would be comparable to metal thermal conductivity.

Accordingly, in example implementations, a dynamic multi-tier maximum-frequency block including temperature and a thermal design power limit may be realized. In certain cases, lower-level tiers (defined as the tier farthest away from the cooling agent) may be optimized for lower power dissipation to compensate for self-heating effects, whereas, in other cases, upper-level tiers (defined as the tier closes to the cooling agent) may be optimized for high frequencies (as their local self-heating effects would be lower). The thermal conductivity of multiple tiers vary depending on the effective junction temperature at each tier.

Figure 32:
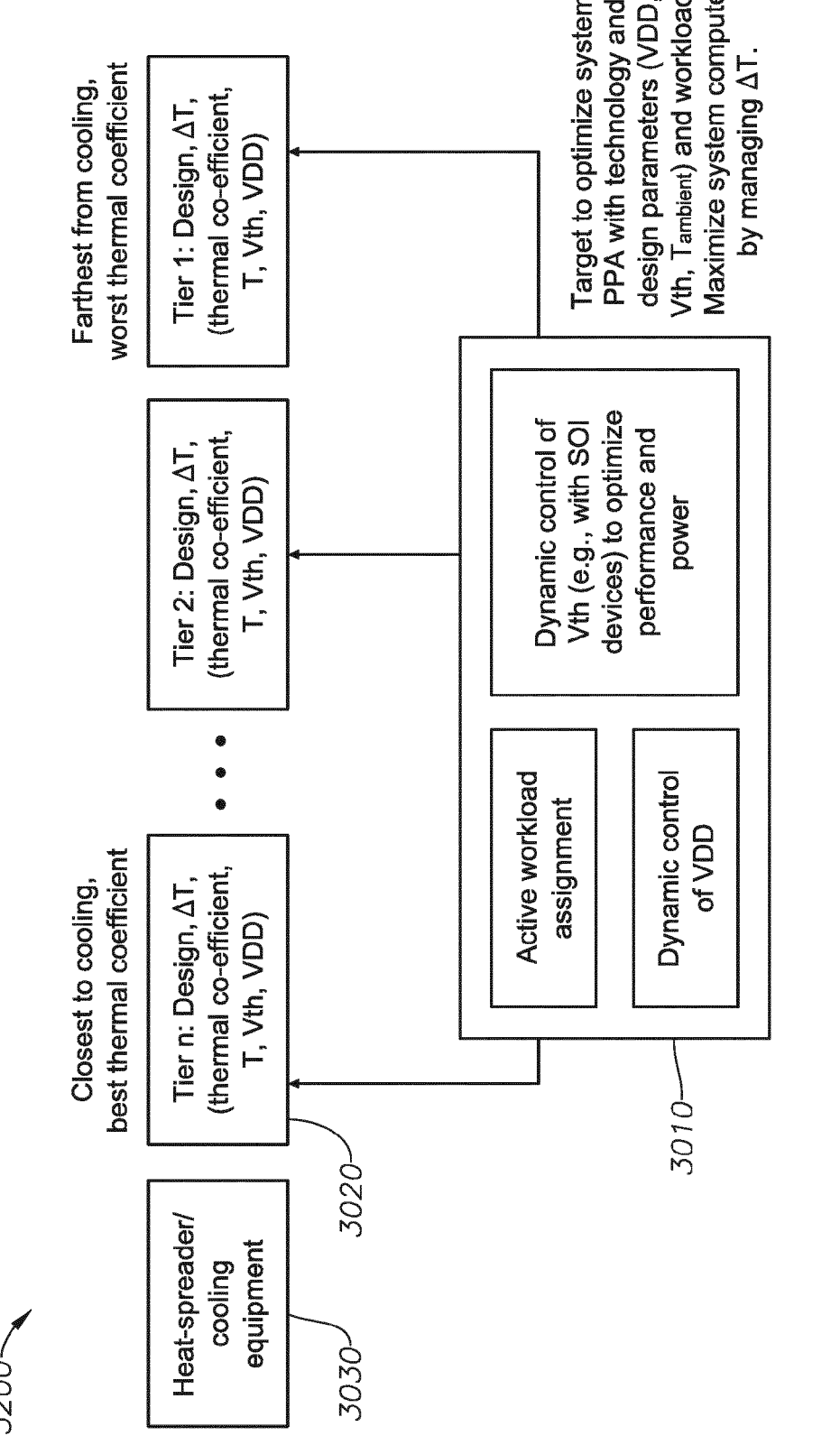
FIG. 32 is a block diagram illustrating certain aspects of various implementations described herein.

Referring to FIG. 32, a flow diagram 3200 according to example implementations is shown. As illustrated, an optimization block 3010 may include: an active workload assignment, a dynamic control of $V_{DD}$, can include a dynamic control of $V_{TH}$ (for example, with silicon on insulator (SOI) devices) to optimize for performance, power and cost). Advantageously, the block 3010 may target to optimize system PPA with technology, design parameters ($V_{DD}$, $V_{TH}$, and $T_{ambient}$), and workload. Hence, by managing a change in temperature (at low temperature operation), a system computer may be maximized.

In certain implementations, the block 3210 would target each tier from tier 1 to tier "n", from the farthest from a heat-spreader/cooling equipment 3230 (tier "1") (e.g., worst thermal coefficient, higher temperature) to the closest to the cooling equipment 3230 (i.e., tier "n") (e.g., best thermal coefficient, lower temperature), based on the parameters including: a design, a change of temperature ($\Delta T$), thermal coefficient, T, $V_{DD}$ and $V_{TH}$).

Figure 33:
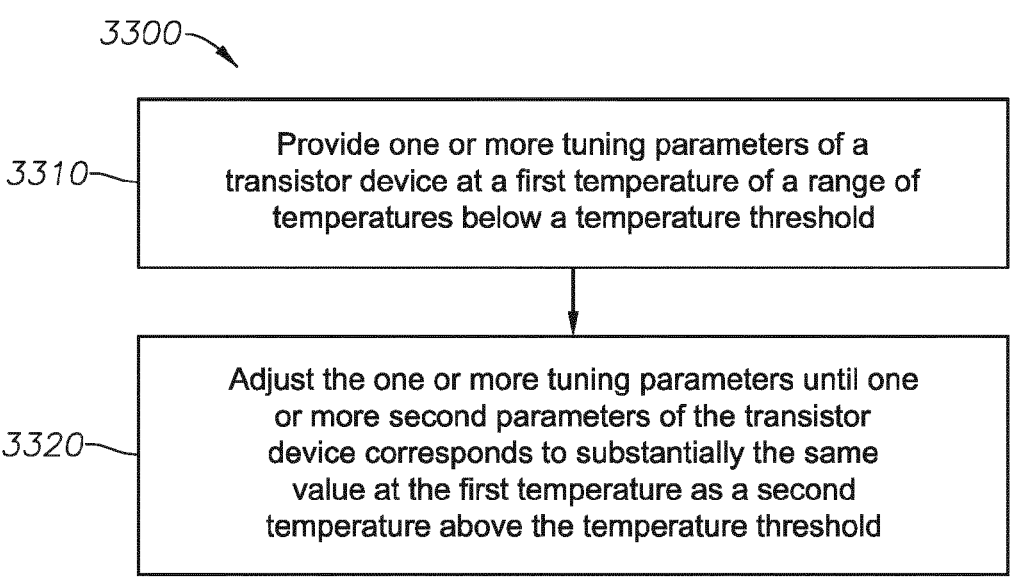

Referring to FIG. 33, a flowchart of an example method 3300 (i.e., procedure, routine) for process-tuning optimization is shown. Advantageously, in various implementations, the method 3000 depicts the steps implemented by the tool 4024 and/or computer system 4000 as described with reference to FIG. 40. The method 3300 may be implemented with reference to the descriptions herein.

At block 3310, one or more tuning parameters of a transistor device at a first temperature of a range of temperatures below a temperature threshold may be provided. For example, with reference to at least FIGS. 1-7, one or more tuning parameters (i.e., independent "knob") of a transistor device at a first temperature (e.g., $T_{cold}$) of a range of temperatures below a temperature threshold can be provided.

At block 3320, the one or more tuning parameters until one or more second parameters of the transistor device corresponds to substantially the same value (or a factor thereof) at the first temperature as a second temperature above the temperature threshold may be adjusted. For example, with reference to at least FIGS. 1-7, the one or more tuning parameters until one or more second parameters of the transistor device corresponds to substantially the same value (or a factor thereof) at the first temperature as a second temperature above the temperature threshold may be adjusted.

Figure 34:
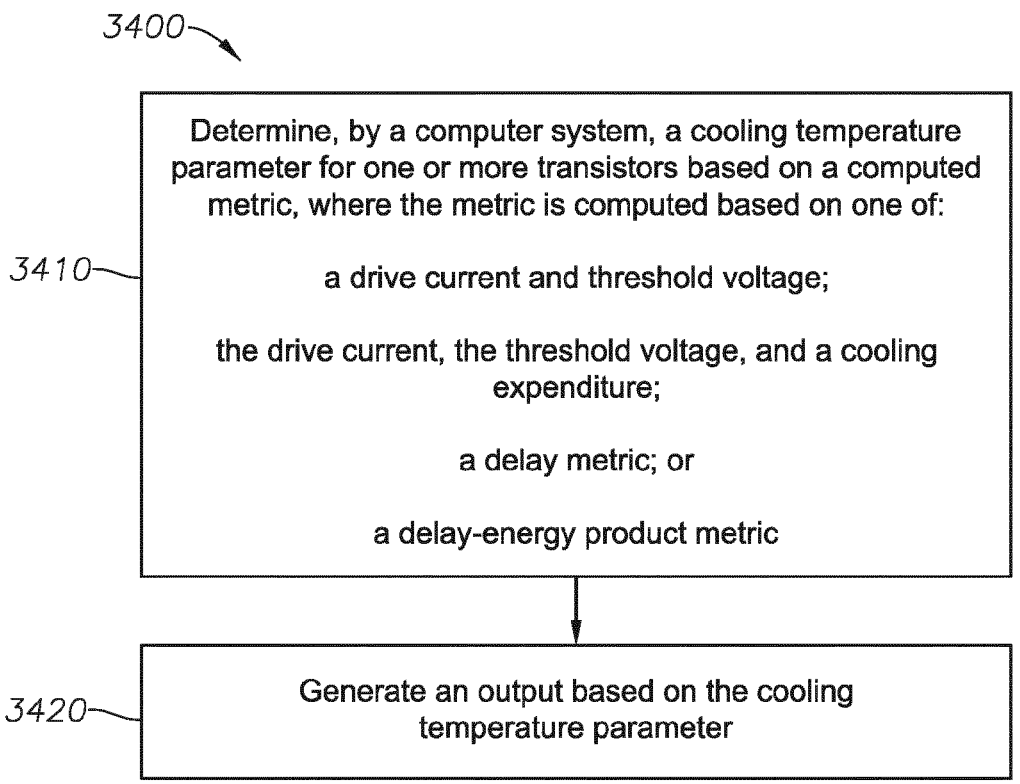

Referring to FIG. 34, a flowchart of an example method 3400 (i.e., procedure, routine) for selection of an optimal cooling temperature is shown. Advantageously, in various implementations, the method 3400 depicts the steps implemented by the tool 4024 and/or computer system 4000 as described with reference to FIG. 40. The method 3400 may be implemented with reference to the descriptions herein.

At block 3410, a computer system (may determine a cooling temperature parameter for one or more transistors based on a computed metric, where the metric is computed based on one of: a supply voltage and/or a drive current and threshold voltage; the drive current, the threshold voltage, and a cooling expenditure; a delay metric; or a delay-energy product metric. For example, with reference to at least FIGS. 8-9, a computer system (e.g., a data center computer system or other computer system) may determine a cooling temperature parameter (i.e., operating point) for one or more transistors based on a computed metric, where the metric is computed based on one of: a drive current and threshold voltage; the drive current, the threshold voltage, and a cooling expenditure; a delay metric; or a delay-energy product metric (e.g., power-delay metric).

At block 3420, an output is generated based on the determined cooling parameter. For example, with reference to at least FIGS. 8-9, an output of may be generated at the computer system applied by the tool 4024.

Referring to FIG. 35, a flowchart of an example method 3500 (i.e., procedure, routine) for selection of an optimal cooling temperature is shown. Advantageously, in various implementations, the method 3500 depicts the steps implemented by the tool 4024 and/or computer system 4000 as described with reference to FIG. 40. The method 3500 may be implemented with reference to the descriptions herein.

At block 3510, a computer system (may determine a cooling temperature parameter for one or more transistors based on a computed metric, where the metric is computed based on one of: a supply voltage; drive current, threshold voltage; cooling expenditure; a delay metric; or a delay-energy product metric. For example, with reference to at least FIGS. 8-9, a computer system (e.g., a data center computer system or other computer system) may determine a cooling temperature parameter (i.e., operating point) for one or more transistors based on a computed metric, where the metric is computed based on one of: on one of: a supply voltage; drive current, threshold voltage; cooling expenditure; a delay metric; or a delay-energy product metric.

At block 3520, an output is generated based on the determined cooling parameter. For example, with reference to at least FIGS. 8-9 and 40, an output of may be generated at the computer system and applied by the tool 4024. Furthermore, in response to determining cooling temperature parameter, the computer system may generate a temperature-based transistor device profile, and reduce a cooling temperature of the one or more transistors based on the temperature-based transistor device profile.

Referring to FIG. 36, a flowchart of an example method 3600 (i.e., procedure, routine) for selection of an optimal cooling temperature is shown. Advantageously, in various implementations, the method 3600 depicts the steps implemented by the tool 4024 and computer system 4000 as described with reference to FIG. 40. The method 3600 may be implemented with reference to the descriptions herein.

At block 3610, the method includes determining whether a material comprises an electromigration below an electromigration threshold for operation at a temperature below a temperature threshold. For example, with reference to at least FIGS. 8-14, determining whether a material comprises an electromigration below an electromigration threshold for operation at a temperature below a temperature threshold is described.

At block 3620, the method includes selecting the material based on a resistivity below a resistivity threshold. For example, with reference to at least FIGS. 8-14, selecting the material based on a resistivity below a resistivity threshold is described.

At block 3630, the method includes providing, in a design tool, a material for one or more interconnects or metal layers based on the selected material. For example, with reference to at least FIGS. 8-14, a design tool (e.g., EDA tool 4024) can provide the material for one or more interconnects or metal layers based on the selected material.

Figure 37:
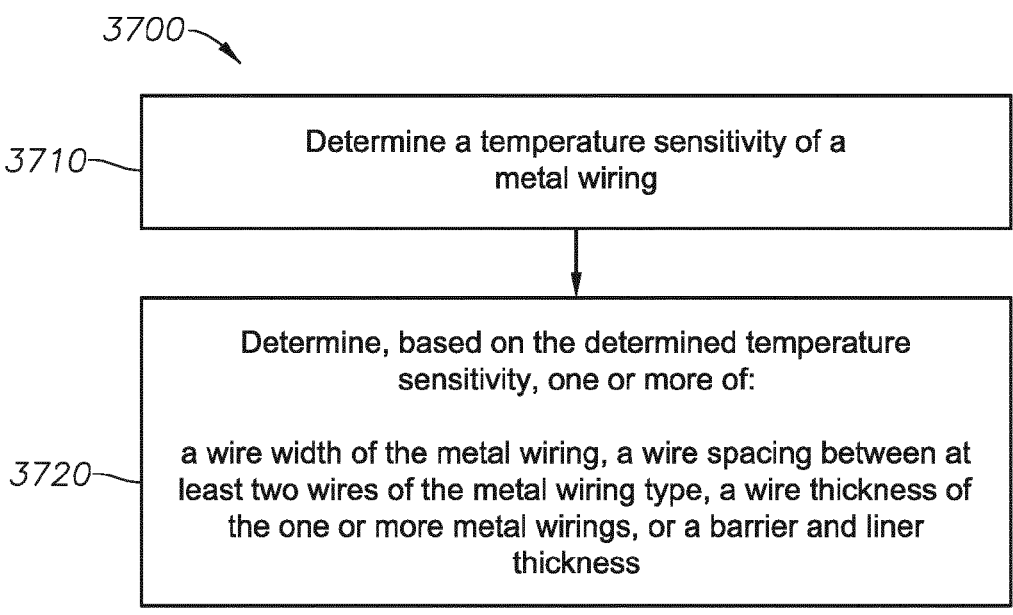

Referring to FIG. 37, a flowchart of an example method 3700 (i.e., procedure, routine) for RC optimization is shown. Advantageously, in various implementations, the method 3700 depicts the steps implemented by the tool 4024 and/or computer system 4000 as described with reference to FIG. 40. The method 3700 may be implemented with reference to the descriptions herein.

At block 3710, the method includes determining a temperature sensitivity of a metal wiring and/or a metal level. For example, with reference to at least FIGS. 15-20B, determining a temperature sensitivity of a metal wiring (i.e., type of metal wiring, e.g., copper) and/or a metal level (e.g., M1-M3 or M7-M9) (of a BEOL stack of an integrated circuit) is described.

At block 3720, the method includes determining, based on the determined temperature sensitivity, one or more of: a wire width of the metal wiring, a wire spacing between at least two wires of the metal wiring type, a wire thickness of the one or more metal wirings, or a barrier and liner thickness. For example, with reference to at least FIGS. 15-20B, determining, based on the determined temperature sensitivity, one or more of: a wire width of the metal wiring, a wire spacing (i.e., a wire distance) between at least two wires of the metal wiring type (arranged proximately and in parallel on the same metal layer), a wire thickness (wire volume) of the one or more metal wirings, or a barrier and liner thickness is described.

In certain implementations, the method further includes generating, by a design tool (e.g., design tool 4024), an output based on the determined one or more of a wire width, a wire spacing, wire thickness, or a barrier and liner thickness.

Figure 38:
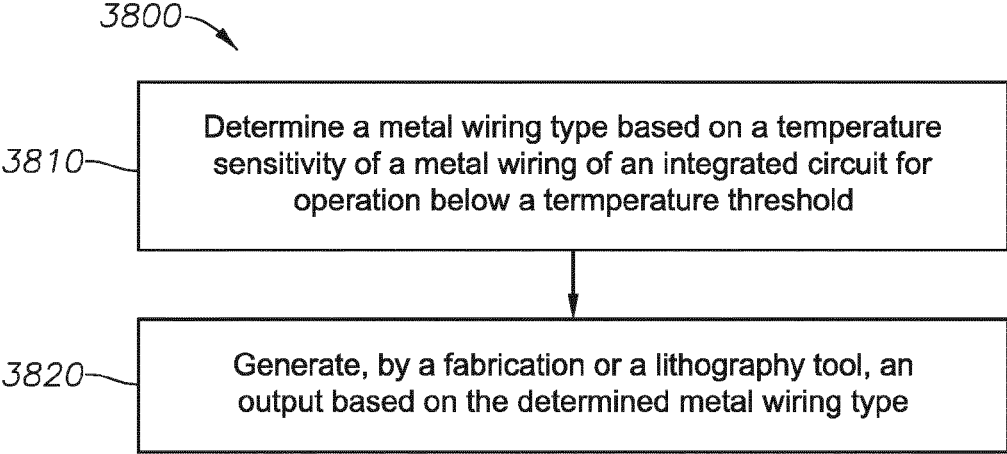

Referring to FIG. 38, a flowchart of an example method 3800 (i.e., procedure, routine) for determining an optimal wiring type is shown. Advantageously, in various implementations, the method 3800 depicts the steps implemented by the tool 4024 and/or computer system 4000 as described with reference to FIG. 40. The method 3800 may be implemented with reference to the descriptions herein.

At block 3810, the method includes determining metal wiring type based on a temperature sensitivity of a metal wiring of an integrated circuit for operation below a temperature threshold. For example, with reference to at least FIGS. 15-20B, determining an optimal metal wiring type based on a temperature sensitivity of a metal wiring of an integrated circuit for operation below a temperature threshold (e.g., below 200K) is described.

At block 3820, the method includes generating, by a fabrication or a lithography tool, an output based on the determined metal wiring type. For example, with reference to at least FIGS. 15-20B, generating, by a fabrication or a lithography tool, an output based on the determined metal wiring type is described.

Figure 39:
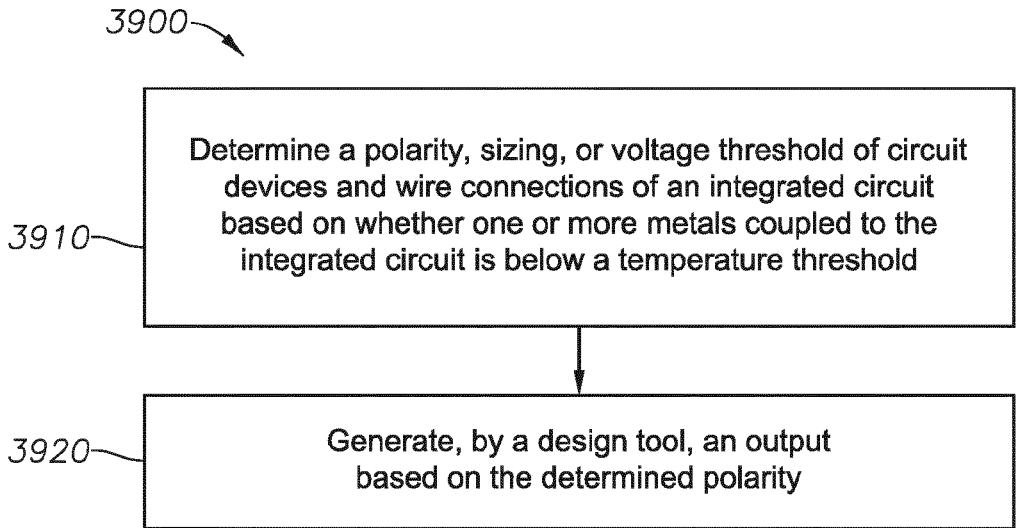

Referring to FIG. 39, a flowchart of an example method 3900 (i.e., procedure, routine) for determining a circuit design for dedicated low temperature operation is shown. Advantageously, in various implementations, the method 3900 depicts the steps implemented by the tool 4024 and/or computer system 4000 as described with reference to FIG. 40. The method 3900 may be implemented with reference to the descriptions herein.

At block 3910, the method includes determining a polarity, sizing, and/or voltage threshold of circuit devices and wire connections of an integrated circuit based on whether one or more metals coupled to the integrated circuit is below a temperature threshold. For example, with reference to at least FIGS. 24A-B o 26A-B determining a polarity (e.g., complimentary PMOS, NMOS, mosFET polarity), sizing, or voltage threshold of circuit devices and wire connections of an integrated circuit based on whether one or more metals coupled to the integrated circuit is below a temperature threshold is described.

At block 3920, the method includes generating, by a design tool (e.g., tool 4024), an output based on the determined polarity. For example, with reference to at least FIGS. 24A-B o 26A-B, by a design tool (e.g., tool 4024), an output based on the determined polarity is described.

In all of the inventive aspects described in this disclosure, for each of the various schemes and techniques materials that can be utilized include one or more of: aluminum, cobalt, copper, ruthenium, molybdenum, or alloys thereof, or any carbon-based conductor material. Moreover, such schemes and techniques may be incorporated in memory devices (e.g., memory macros) and logical devices (i.e., logic cells), or other internal routing, or BEOL stack wiring. In all of the inventive aspects described in this disclosure, for each of the various schemes and techniques inventive transistor device include metal-oxide-semiconductor field-effect transistor (MOSFET) devices (including finFET devices, planar devices or other transistor variants (e.g., gate-all-around (GAA) devices such as nanosheet and nanowire devices)).

Figure 40:
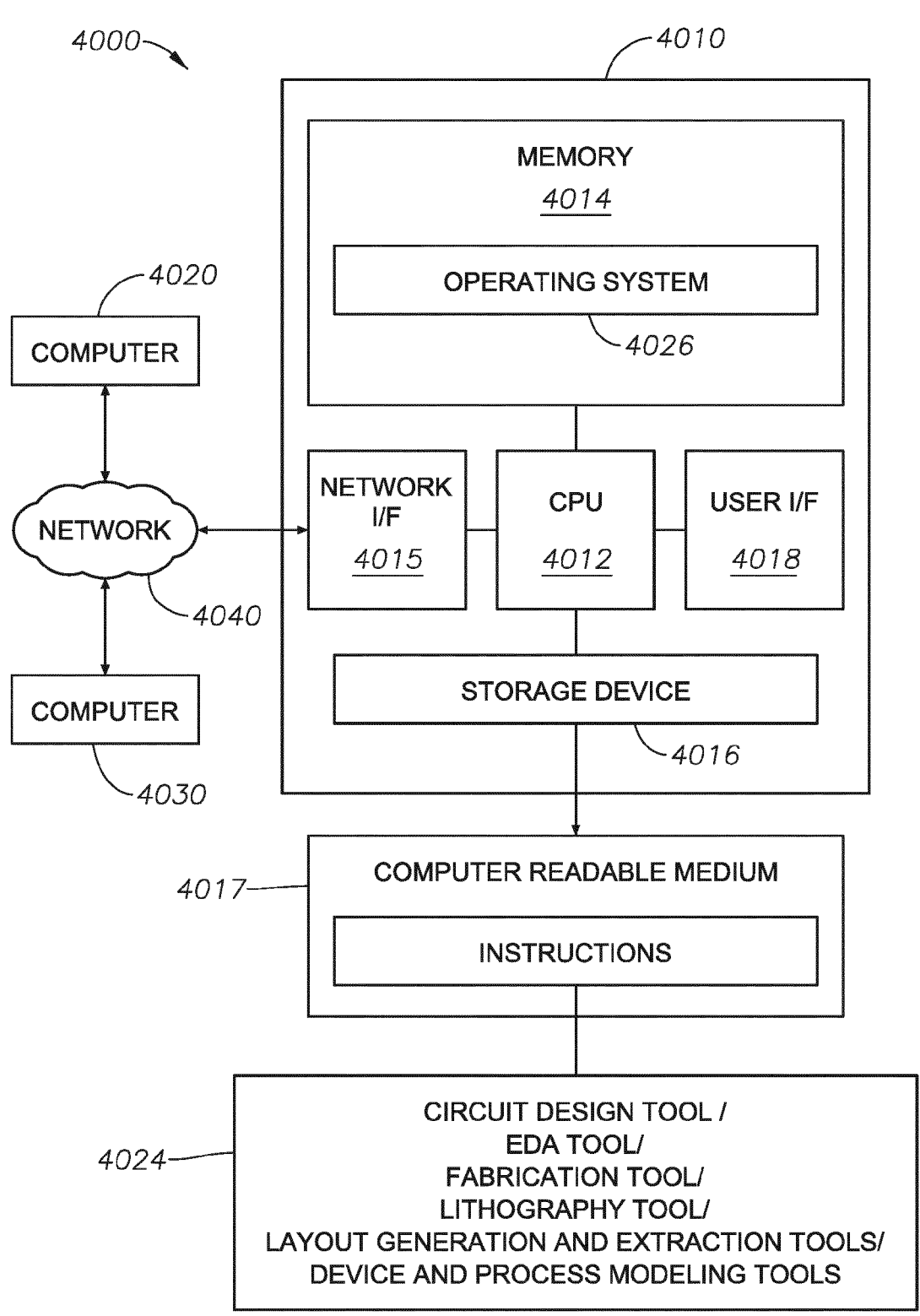
FIG. 40 is a block diagram in accordance with various implementations described herein.

FIG. 40 illustrates example hardware components in a computer system 4000. In some implementations, the computer system 4000 may be a foundry data center computer system, and in other implementations, the computer system 4000 may be a memory compiler system. The system 4000 can be utilized to generate one or more of device tuning, integrated circuit design, memory architecture output, logic design, memory macros, interconnect and BEOL design; and determine optimal transistor level, integrated circuit level, EDA optimization, system-level design and maximum frequency optimization, datacenter level PPAC optimization, and multi-tier system level optimization. In certain implementations, the example computer system 4000 (e.g., networked computer system and/or server) may include electronic design automation tool (EDA) (4024) (e.g., layout generation and extraction tools, and device and process modelling tools, circuit design tool, fabrication tool, lithography tool) and execute software based on the procedure as described with reference to at least methods 3300-3900, and other methods as described throughout the disclosure and as referenced with reference to FIGS. 1-32. In certain implementations, the EDA tool 4024 may be included as a feature of an existing memory compiler software program allowing users to input power grid and cell layout criteria, and generate power grids and cell layouts accordingly.

In certain cases, the EDA tool 4024 may provide generated computer-aided physical layout designs for memory architecture. The procedures 3300 to 3900 (and other procedures discussed throughout the disclosure) may be stored as program code as instructions 4017 in the computer readable medium of the storage device 4016 (or alternatively, in memory 4014) that may be executed by the computer 4010, or networked computers 4020, 4030, other networked electronic devices (not shown) or a combination thereof. In certain implementations, each of the computers 4010, 4020, 4030 may be any type of computer, computer system, or other programmable electronic device. Further, each of the computers 4010, 4020, 4030 may be implemented using one or more networked computers, e.g., in a cluster or other distributed computing system.

In certain implementations, the system 4000 may be used with semiconductor integrated circuit (IC) designs that contain all standard cells, all blocks or a mixture of standard cells and blocks. In a particular example implementation, the system 4000 may include in its database structures: a collection of cell libraries, one or more technology files, a plurality of cell library format files, a set of top design format files, one or more Open Artwork System Interchange Standard (OASIS/OASIS.MASK) files, and/or at least one EDIF file. The database of the system 4000 may be stored in one or more of memory 4014 or storage devices 4016 of computer 4010 or in networked computers 4020, 4020.

In certain implementations, the system 4000 may perform the following functions automatically, with variable user input: determination of read current requirements/thresholds (i.e., Iread), determination of leakage current requirements/thresholds (i.e., Ileak), identification of logic designs (i.e., periphery circuit designs (i.e., logic threshold voltages, threshold voltage implant layers)), determination of a desired threshold voltage-combination, determination of minimum voltage assist requirements (i.e., Vmin assist), identification of bit-cell types, determination of memory specific optimization modes (memory optimization mode), floor-planning, including generation of cell regions sufficient to place all standard cells; standard cell placement: power and ground net routing; global routing; detail routing and pad routing. In some instances, such functions may be performed substantially via user input control. Additionally, such functions can be used in conjunction with the manual capabilities of the system 4000 to produce the target results that are required by a designer. In certain implementations, the system 1000 may also provide for the capability to manually perform functions such as: cell region creation, block placement, pad and cell placement (before and after automatic placement), net routing before and after automatic routing and layout editing. Moreover, verification functions included in the system 4000 may be used to determine the integrity of a design after, for example, manual editing, design rule checking (DRC) and layout versus schematic comparison (LVS).

In one implementation, the computer 4000 includes a central processing unit (CPU) 4012 having at least one hardware-based processor coupled to a memory 4014. The memory 4014 may represent random access memory (RAM) devices of main storage of the computer 4010, supplemental levels of memory (e.g., cache memories, non-volatile or backup memories (e.g., programmable or flash memories)), read-only memories, or combinations thereof. In addition to the memory 4014, the computer system 4000 may include other memory located elsewhere in the computer 4010, such as cache memory in the CPU 4012, as well as any storage capacity used as a virtual memory (e.g., as stored on a storage device 4016 or on another computer coupled to the computer 4010).

The computer 4010 may further be configured to communicate information externally. To interface with a user or operator (e.g., a circuit design engineer), the computer 4010 may include a user interface (I/F) 4018 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 4010 may include a network interface (I/F) 4015 which may be coupled to one or more networks 4040 (e.g., a wireless network) to enable communication of information with other computers and electronic devices. The computer 4060 may include analog and/or digital interfaces between the CPU 4012 and each of the components 4014, 4015, 4016, and 4018. Further, other non-limiting hardware environments may be used within the context of example implementations.

The computer 4010 may operate under the control of an operating system 4026 and may execute or otherwise rely upon various computer software applications, components, programs, objects, modules, data structures, etc. (such as the programs associated with the procedures e.g., 3300-3900, and related software). The operating system 4028 may be stored in the memory 4014. Operating systems include, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 4026 in the example of FIG. 40 is shown in the memory 4014, but components of the aforementioned software may also, or in addition, be stored at non-volatile memory (e.g., on storage device 4016 (data storage) and/or the non-volatile memory (not shown). Moreover, various applications, components, programs, objects, modules, etc. may also execute on one or more processors in another computer coupled to the computer 4010 via the network 4040 (e.g., in a distributed or client-server computing environment) where the processing to implement the functions of a computer program may be allocated to multiple computers 4020, 4030 over the network 4040.

In example implementations, circuit macro diagrams have been provided in certain figures described herein, whose redundant description has not been duplicated in the related description of analogous circuit macro diagrams. It is expressly incorporated that the same cell layout diagrams with identical symbols and/or reference numerals are included in each of embodiments based on its corresponding figure(s).

Although one or more of FIGS. 1-40 may illustrate systems, apparatuses, or methods according to the teachings of the disclosure, the disclosure is not limited to these illustrated systems, apparatuses, or methods. One or more functions or components of any of FIGS. 1-40 as illustrated or described herein may be combined with one or more other portions of another of FIGS. 1-40. Accordingly, no single implementation described herein should be construed as limiting and implementations of the disclosure may be suitably combined without departing form the teachings of the disclosure.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 614, the storage device 616, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
providing one or more tuning parameters of a transistor device at a first temperature of a range of temperatures below a temperature threshold; and
adjusting the one or more tuning parameters until one or more second parameters of the transistor device corresponds to substantially a same value or a factor thereof at the first temperature as a second temperature above the temperature threshold.

2. The method of claim 1, wherein the adjustment of the one or more tuning parameters comprise: decreasing, at the transistor device, a threshold voltage for the range of temperatures below the temperature threshold.

3. The method of claim 2, wherein the threshold voltage corresponds to a multi-voltage threshold.

4. The method of claim 1, wherein the one or more second parameters corresponds to a leakage current or a factor thereof.

5. The method of claim 1, wherein the second temperature corresponds to one of a plurality of room temperatures.

6. The method of claim 1, wherein the adjustment of the one or more tuning parameters comprise:
decreasing a supply voltage and a threshold voltage of the transistor device to respective reduced voltages.

7. The method claim 6, wherein the one or more second parameters corresponds to a leakage current or a factor thereof, a performance/watt, and a cell area.

8. The method of claim 1, further comprising:
generating an output, at a computer, based on the adjusted one or more tuning parameters.

* * * * *